US011647127B2

(12) United States Patent
Saeda et al.

(10) Patent No.: US 11,647,127 B2
(45) Date of Patent: May 9, 2023

(54) IMAGE PROCESSING SYSTEM INCLUDES AT LEAST AN IMAGE PROCESSING DEVICE, MOBILE TERMINAL AND INFORMATION PROCESSING DEVICE THAT HAS CHATBOT FUNCTION TO RECEIVE A QUESTION, AND THE IMAGE PROCESSING DEVICE GENERATES ACTIVATION DATA FOR ACTIVATING THE CHATBOT FUNCTION

(71) Applicant: SHARP KABUSHIKI KAISHA, Sakai (JP)

(72) Inventors: Masao Saeda, Sakai (JP); Yasuhiro Nakai, Sakai (JP); Kohichi Murakami, Sakai (JP); Yasutomo Hayano, Sakai (JP); Emiko Matsuo, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 54 days.

(21) Appl. No.: 17/486,526

(22) Filed: Sep. 27, 2021

(65) Prior Publication Data
US 2022/0109762 A1 Apr. 7, 2022

(30) Foreign Application Priority Data

Oct. 2, 2020 (JP) .............................. JP2020-167740

(51) Int. Cl.
H04N 1/00 (2006.01)
(52) U.S. Cl.
CPC ....... H04N 1/00307 (2013.01); H04N 1/0097 (2013.01); H04N 1/00244 (2013.01); H04N 1/00352 (2013.01); H04N 1/00474 (2013.01); H04N 1/00482 (2013.01); H04N 1/00411 (2013.01); H04N 2201/0094 (2013.01)

(58) Field of Classification Search
None
See application file for complete search history.

(56) References Cited

U.S. PATENT DOCUMENTS

| 11,327,696 B2* | 5/2022 | Sugimoto | G06F 3/1257 |
| 2013/0063774 A1* | 3/2013 | Nuggehalli | G06F 3/1298 |
| | | | 358/1.15 |
| 2013/0321856 A1* | 12/2013 | Bell | G06F 3/1288 |
| | | | 358/1.15 |

(Continued)

FOREIGN PATENT DOCUMENTS

| CN | 111353093 A | 6/2020 |
| JP | 2005-250623 A | 9/2005 |
| JP | 2019-191958 A | 10/2019 |

Primary Examiner — Haris Sabah
(74) Attorney, Agent, or Firm — ScienBiziP, P.C.

(57) ABSTRACT

An image processing system includes a server, an image processing device, and a mobile terminal. When a chatbot activation operation is received, the image processing device transmits activation data for activating a chatbot and operation history data up to the time of activation of the chatbot to the mobile terminal. When the activation data is received, the mobile terminal accesses the server to activate the chatbot and transmits the operation history data to the server. When a question is input, the mobile terminal transmits the data on the question to the server. When the data on the question is received, the server generates an answer in accordance with the content of the question and the operation history.

4 Claims, 19 Drawing Sheets

(56) References Cited

U.S. PATENT DOCUMENTS

| | | |
|---|---|---|
| 2015/0172505 A1 | 6/2015 | Park et al. |
| 2019/0317709 A1 | 10/2019 | Sugimoto et al. |
| 2021/0144266 A1* | 5/2021 | Tsukada ............. H04N 1/00212 |

* cited by examiner ial config # IMAGE PROCESSING SYSTEM INCLUDES AT LEAST AN IMAGE PROCESSING DEVICE, MOBILE TERMINAL AND INFORMATION PROCESSING DEVICE THAT HAS CHATBOT FUNCTION TO RECEIVE A QUESTION, AND THE IMAGE PROCESSING DEVICE GENERATES ACTIVATION DATA FOR ACTIVATING THE CHATBOT FUNCTION

BACKGROUND OF THE INVENTION

Field of the Invention

The present invention relates to an image processing system, and more particularly, an image processing system that uses for example a chatbot to support a user.

Description of the Background Art

Japanese Unexamined Patent Publication No. 2019-191958 discloses an example of this kind of background art. A message service system according to the background art includes a user terminal used by a user and a chat service server so that the user operates the user terminal to access the chat service server in the cloud, exchanges messages with a chatbot, and causes the chatbot to perform a service such as print service.

According to the background art, however, a user unfamiliar with the chatbot sometimes does not know what to input when inputting the content of an inquiry or improperly inputs unintended content. When the content of the inquiry is inappropriate, the answer from the chatbot has the content unintended by the user, and there is room for improvements in terms of operability.

Thus, the principal object of the present invention is to provide a novel image processing system.

Another object of the present invention is to provide an image processing system that may improve the operability of a user support service using a chatbot.

SUMMARY OF THE INVENTION

A first invention is that an image processing system includes: an image processing device; a mobile terminal; and an information processing device, and the information processing device has a chatbot function to receive a question, transmitted from the mobile terminal, about the image processing device and automatically give an answer. The image processing device includes: an inputter that receives an input operation by a user; an activation data generator that generates activation data for activating the chatbot function from the mobile terminal when a predetermined activation operation is received; an operation history data generator that generates data on an operation history of the input operations received by the inputter; and a first transmitter that transmits the activation data and the data on the operation history to the mobile terminal. The mobile terminal includes: a first acquirer that acquires the activation data and the data on the operation history; an accessor that accesses the chatbot function of the information processing device in accordance with the activation data; a second transmitter that transmits the data on the operation history to the information processing device when accessing the chatbot function; and a third transmitter that transmits data on a question input by the user, to the information processing device. The information processing device includes: a second acquirer that acquires the data on the question and the data on the operation history; and an answerer that answers the question in accordance with content of the question and content of the operation history.

A second invention according to the first invention is that the image processing device and the mobile terminal are capable of performing a wireless communication with each other, and the first acquirer acquires the activation data and the data on the operation history via the wireless communication.

A third invention according to the first invention or the second invention is that the information processing device further includes a predictive conversion candidate setter that sets a predictive conversion candidate word in accordance with the content of the operation history, and the mobile terminal further includes: a third acquirer that acquires data on the predictive conversion candidate word from the information processing device; and a presenter that presents the predictive conversion candidate word when an input of the question is received.

A fourth invention according to any invention from the first invention to the third invention is that the information processing device further includes an expected question setter that sets an expected question in accordance with the content of the operation history, and the mobile terminal further includes: a fourth acquirer that acquires data on the expected question from the information processing device; and a presenter that presents the expected question when an input of the question is received.

According to the present invention, the operability of a user support service using a chatbot may be improved.

The above-described object of the present invention, other objects, features, and advantages may be more apparent from the following detailed descriptions of embodiments with reference to the drawings.

DESCRIPTION OF THE PREFERRED EMBODIMENTS

First Embodiment

Figure 1:
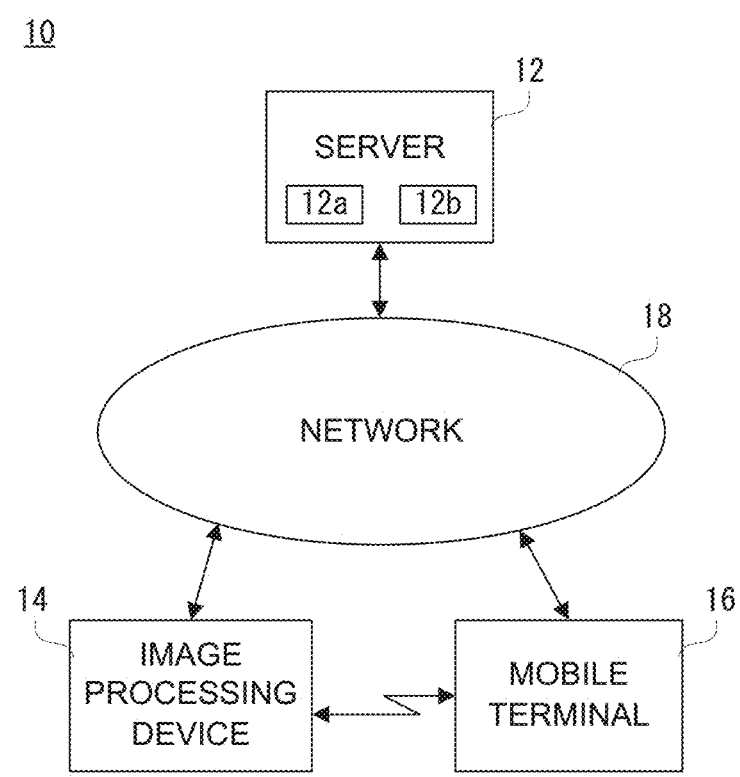
FIG. 1 is a schematic diagram illustrating a configuration of an image processing system according to an embodiment of the present invention.

FIG. 1 is a diagram illustrating an example of a configuration of an image processing system 10 according to the present invention. With reference to FIG. 1, the image processing system 10 according to a first embodiment of the present invention includes a server (information processing device) 12, an image processing device 14, and a mobile terminal 16. The server 12 is communicatively connected to the image processing device 14 and the mobile terminal 16 via a network 18, such as the Internet or a LAN.

The server 12 is a general-purpose server including components such as a CPU 12a, a RAM 12b, and a communication module. The server 12 includes a storage including a non-volatile memory such as HDD, flash memory, or EEPROM or a semiconductor memory such as SSD.

The image processing device 14 is a multifunction peripheral (MFP) having a copier (copy) function, a printer function, a scanner function, a facsimile (fax) function, etc. The image processing device 14 is provided (installed) in a store such as supermarket, restaurant, or convenience store and in a public facility such as station, bus terminal, airport, government office, or library to provide a predetermined service (function) to a user depending on its installation location based on the assumption that it is used by an unspecified number of persons (users).

Figure 2:
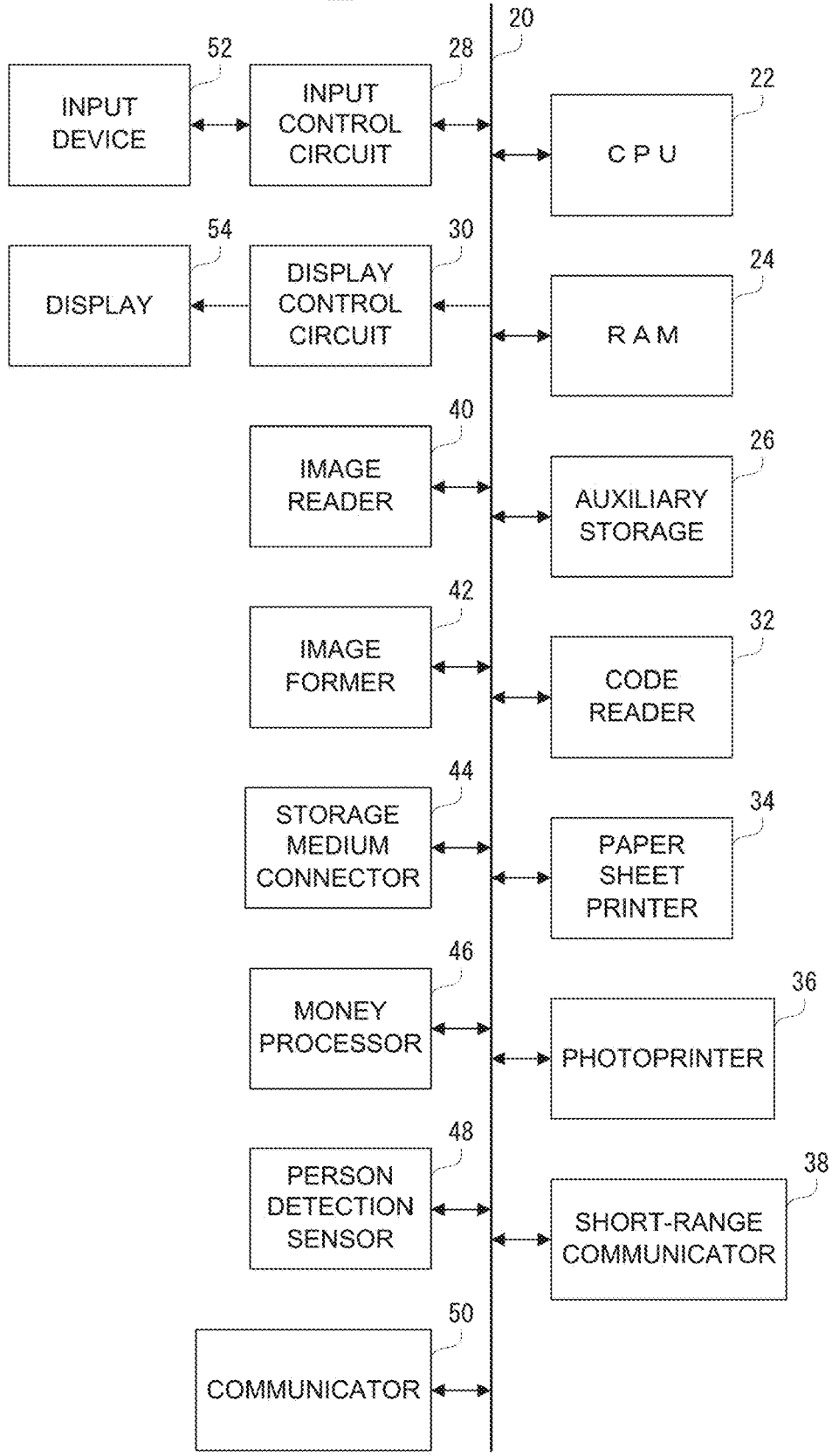
FIG. 2 is a block diagram illustrating an electrical configuration of an image processing device illustrated in FIG. 1.

FIG. 2 is a block diagram illustrating an electrical configuration of the image processing device 14 illustrated in FIG. 1. With reference to FIG. 2, the image processing device 14 includes a CPU 22. The CPU 22 is coupled via a bus 20 to a RAM 24, an auxiliary storage 26, an input control circuit 28, a display control circuit 30, a code reader 32, a paper sheet printer 34, a photoprinter 36, a short-range communicator 38, an image reader 40, an image former 42, a storage medium connector 44, a money processor 46, a person detection sensor 48, and a communicator 50. The input control circuit 28 is coupled to an input device 52, and the display control circuit 30 is coupled to a display 54, such as an LCD or EL display.

The CPU 22 performs the overall control on the image processing device 14. The RAM 24 is a primary storage of the CPU 22 and is used as a work area and a buffer area.

The auxiliary storage 26 is an auxiliary storage device of the image processing device 14 to store a control program, various types of data, and the like, for controlling an operation of each component in the image processing device 14 by the CPU 22. A memory such as an HDD is used as the auxiliary storage 26. The same applies to an auxiliary storage 66 described below.

The input device 52 is a device that receives a user's input operation (user operation) and includes, for example, a touch panel and a hardware operation button or operation key (hardware key). The touch panel is a general-purpose touch panel and may adopt any type, such as capacitive type, electromagnetic induction type, resistive type, or infrared type. The touch panel may be provided on a display surface of the display 54 or may be provided separately from the display 54, or a touch display may be provided in which the touch panel and the display 54 are integrally formed. When the touch panel is provided on the display surface of the display 54, the display 54 presents a graphical user interface (GUI) including a software key such as an icon to receive a user operation via the GUI.

The software key refers to, for example, a key or icon reproduced as software on the display surface of the display. On the other hand, the hardware key refers to a key or push button that is provided as a physical device.

The input control circuit 28 outputs an operation signal or operation data corresponding to an operation of the input device 52 to the CPU 22. For example, the input control circuit 28 applies the necessary voltage, or the like, to the touch panel included in the input device 52, and when a touch operation (touch input) is performed within a touch effective range of the touch panel, outputs the touch coordinate data indicating the position of the touch input to the CPU 22. The input control circuit 28 outputs an operation signal or operation data corresponding to an operation of the operation button or hardware key included in the input device 52 to the CPU 22.

The display control circuit 30 includes a GPU, a VRAM, and the like so that, under an instruction from the CPU 22, the GPU generates, in the VRAM, display image data for displaying various screens on the display 54 using image generation data stored in the RAM 24 and outputs the generated display image data to the display 54.

The code reader 32 includes, for example, a laser scanner or a camera so as to read a code attached to a product, card, receipt, or the like, or a code (coded image), or the like, displayed on a screen of the mobile terminal 16. Codes readable by the code reader 32 include bar codes (one-dimensional bar codes) or two-dimensional codes (e.g., QR codes (registered trademark), Micro QR codes, DataMatrix, MaxiCode, and VeriCode).

The paper sheet printer 34 is, for example, a thermal printer or a dot impact printer to issue a sheet of paper having an image printed thereon, such as a receipt, acknowledgement, journal, or coupon. Specifically, the paper sheet printer 34 prints various character strings, images, code patterns (such as barcodes), and the like on a roll of paper, and discharges the printed paper sheet.

The photoprinter 36 is, for example, a dye sublimation printer or an inkjet printer to print an image on paper for photo (photo paper). The photo printed by the photoprinter 36 is discharged into a photo discharge part provided on a side surface of the image processing device 14. Image data stored in a storage medium coupled to the storage medium connector 44, image data transmitted from an external computer, or the like, is used as the image data for forming an image on the paper.

The short-range communicator 38 performs, for example, wireless and contactless data communication with a communication target including an IC card (such as identification card, membership card, or employee identification card) or a mobile terminal in accordance with a communication standard such as ISO/IEC 18092 (what is called Near Field Communication (NFC)). The communicable distance of the short-range communicator 38 is approximately from several centimeters to several meters. For example, the short-range communicator 38 transmits, to the communication target, a signal (read command) for giving an instruction to read data stored in the communication target. In this case, the communication target transmits the desired data to the short-range communicator 38 as a response to the read command. The short-range communicator 38 transmits, to the communication target, a signal (write command) for giving an instruction to write, together with data (write data) to be written. In this case, the communication target writes (stores) the received write data in a storage of the communication target in response to the write command.

The image reader 40 includes a light source, a plurality of mirrors, an imaging lens, a line sensor, etc. The image reader 40 exposes the surface of an original with a light source and guides reflected light, which is reflected by the surface of the original, to the imaging lens with the plurality of mirrors. Then, the reflected light is focused on a light receiving element of the line sensor by the imaging lens. The line sensor detects the luminance and chromaticity of the reflected light focused on the light receiving element and generates the read image data based on the image of the original surface.

The image former (printing device) 42 is a general-purpose laser printer including a photoconductor, a charger, an exposure device, a developing device, a transfer device, a fuser, and the like, to print an image (print image) corresponding to print image data on a recording sheet (paper), etc. The image former 42 may be configured by not only a laser printer but also an inkjet printer.

Although not described in detail, the image former 42 has a color print function and includes an image forming station including a photoconductor, a charger, a developing device, and the like, for each of colors yellow (Y), magenta (M), cyan (C), and black (K).

The storage medium connector 44 includes a mounting part (e.g., a drive and a memory slot) for mounting various storage media. For example, the storage media include optical disks (e.g., CD-R, DVD-R, and BD-R) and flash memory (e.g., USB memory, SD memory card, and memory stick). An optical disk is mounted on the drive, and a flash memory is mounted on the memory slot.

The money processor 46 includes a money input part and a coin return slot. The money input part includes a coin input slot, a bill input slot, a change return lever, etc. The coin input through the coin input slot and the bill input through the bill input slot are classified for each type and stored in a predetermined money storage. The money storage includes a storage for coins and a storage for bills. When a coin or bill is input, the amount of input money is calculated in accordance with the type and number of coins stored in the storage for coins and the type and number of bills stored in the storage for bills. When a predetermined service or the like is performed in the image processing device 14, the cost corresponding to the content of the service is subtracted from the amount of input money, and the remaining amount of the input money is calculated. When the change return lever is operated, a coin or bill is returned in accordance with the remaining amount of the input money. Coins are returned through the coin return slot, and bills are returned through the bill input slot.

The person detection sensor 48 is a sensor that detects whether a person (user) is present in a predetermined area (zone) set in front of the image processing device 14 and is, for example, a distance sensor. For example, an infrared sensor, ultrasonic sensor, or laser distance sensor is used as the distance sensor. The distance sensor outputs distance data to the CPU 22. The CPU 22 determines whether a person is present in the predetermined area in front of the image processing device 14 depending on whether the distance indicated by the distance data output from the person detection sensor 48 falls within a predetermined distance that defines the predetermined area.

The communicator 50 is a communication circuit to connect to the network 18. The communicator 50 includes a wired communication circuit or a wireless communication circuit to communicate with an external computer (external terminal) such as the server 12 and the mobile terminal 16 via the network 18 in accordance with an instruction from the CPU 22 based on a communication method conforming to a known communication standard. The communicator 50 may directly communicate with other external computers such as the mobile terminal 16 wirelessly (e.g., infrared system, WiFi (registered trademark) system, or Bluetooth (registered trademark) system) without involving the network 18.

The electrical configuration of the image processing device 14 illustrated in FIG. 2 is merely an example and is not limited thereto.

The mobile terminal 16 is, for example, a portable (trans-portable) terminal (mobile terminal) that may be carried around, such as a general-purpose smartphone, future phone, or tablet PC, and has various functions such as a call function, an e-mail function, and a browser function. The mobile terminal 16 is not limited to a terminal possessed by the user, but may also be a terminal provided at an installation location (such as a store) of the image processing device 14.

Figure 3:
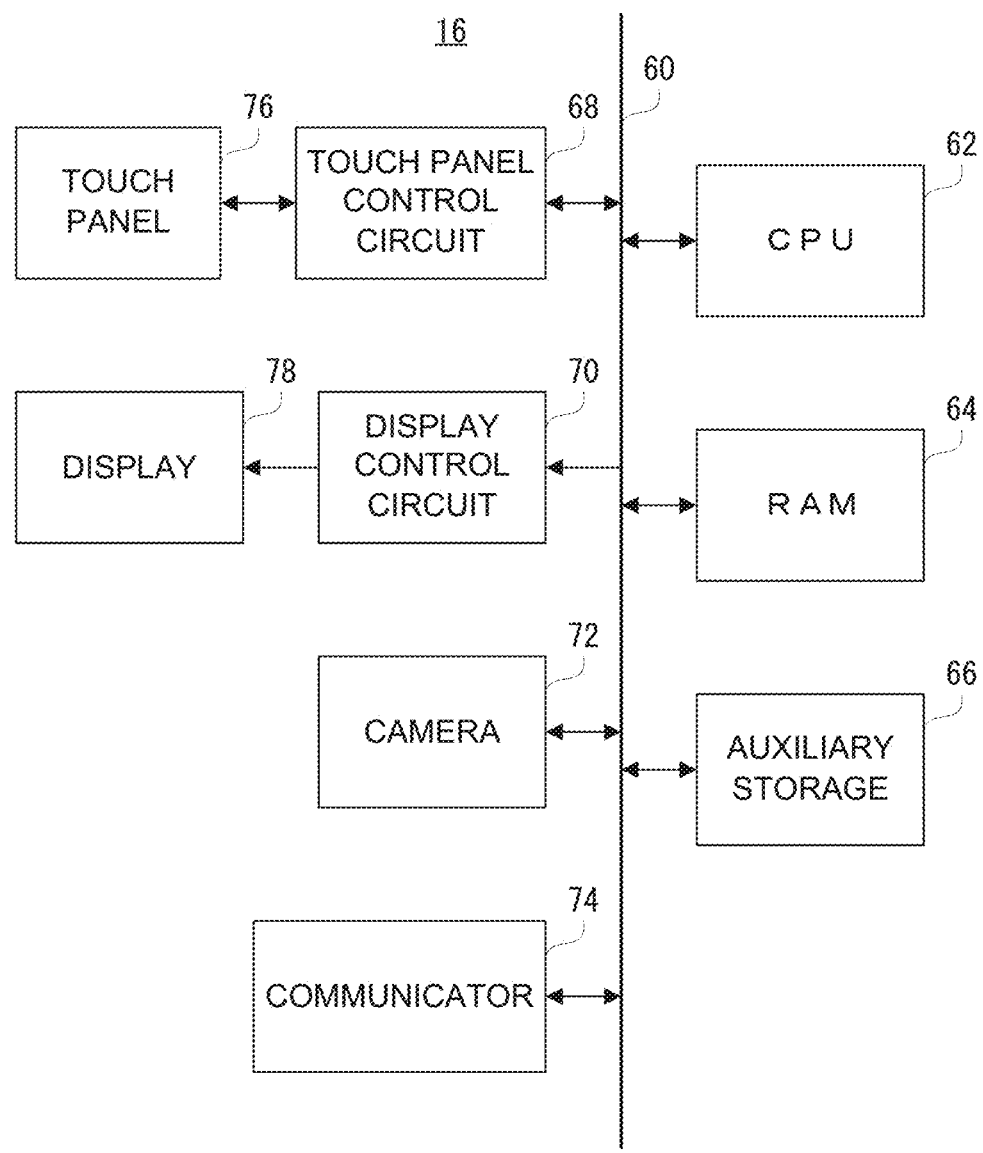
FIG. 3 is a block diagram illustrating an electrical configuration of a mobile terminal illustrated in FIG. 1.

FIG. 3 is a block diagram illustrating an electrical configuration of the mobile terminal 16 illustrated in FIG. 1. With reference to FIG. 3, the mobile terminal 16 includes a CPU 62. The CPU 62 is coupled via a bus 60 to a RAM 64, the auxiliary storage 66, a touch panel control circuit 68, a display control circuit 70, a camera 72, and a communicator 74. The touch panel control circuit 68 is coupled to a touch panel 76, and the display control circuit 70 is coupled to a display 78, such as an LCD or EL display.

The CPU 62 performs the overall control on the mobile terminal 16. The RAM 64 is used as a work area and a buffer area of the CPU 62. The auxiliary storage 66 is an auxiliary storage device of the mobile terminal 16.

The touch panel control circuit 68 applies the necessary voltage, or the like, to the touch panel 76 and, when a touch input is detected, outputs the touch coordinate data indicating the position of the touch input to the CPU 62.

The display control circuit 70 includes a GPU, a VRAM, and the like so that, under an instruction from the CPU 62, the GPU generates, in the VRAM, display image data for displaying various screens on the display 78 using image generation data stored in the RAM 64 and outputs the generated display image data to the display 78.

The camera 72 includes an imaging device (image sensor) and a focus lens, or the like, whose position is adjustable, to capture an image by converting the captured light as visible light taken from the imaging device into an electrical signal. Examples of the imaging device include a solid-state imaging device such as a charge coupled device (CCD) image sensor or a complementary metal oxide semiconductor (CMOS) image sensor. The RAM 64 stores captured image data output from the camera 72.

The communicator 74 includes a wireless communication circuit to connect to the network 18 and communicates with an external computer such as the server 12 and the image processing device 14 via the network 18 in response to an instruction from the CPU 22. The communicator 74 may also communicate directly with other external computers such as the image processing device 14 wirelessly without involving the network 18.

The electrical configuration of the mobile terminal 16 illustrated in FIG. 3 is merely an example and does not need to be limited thereto. For example, the mobile terminal 16 may include a hardware operation button as another input device. For simplicity, components related to calls, etc. are omitted from FIG. 3.

As described above, the image processing device 14 receives a user operation via the GUI presented on the display 54. For example, a plurality of operation screens (setting screens) for setting operation conditions of the image processing device 14 are presented to the user, and a service is provided in accordance with the details (operation conditions) set on each operation screen.

Figure 4:
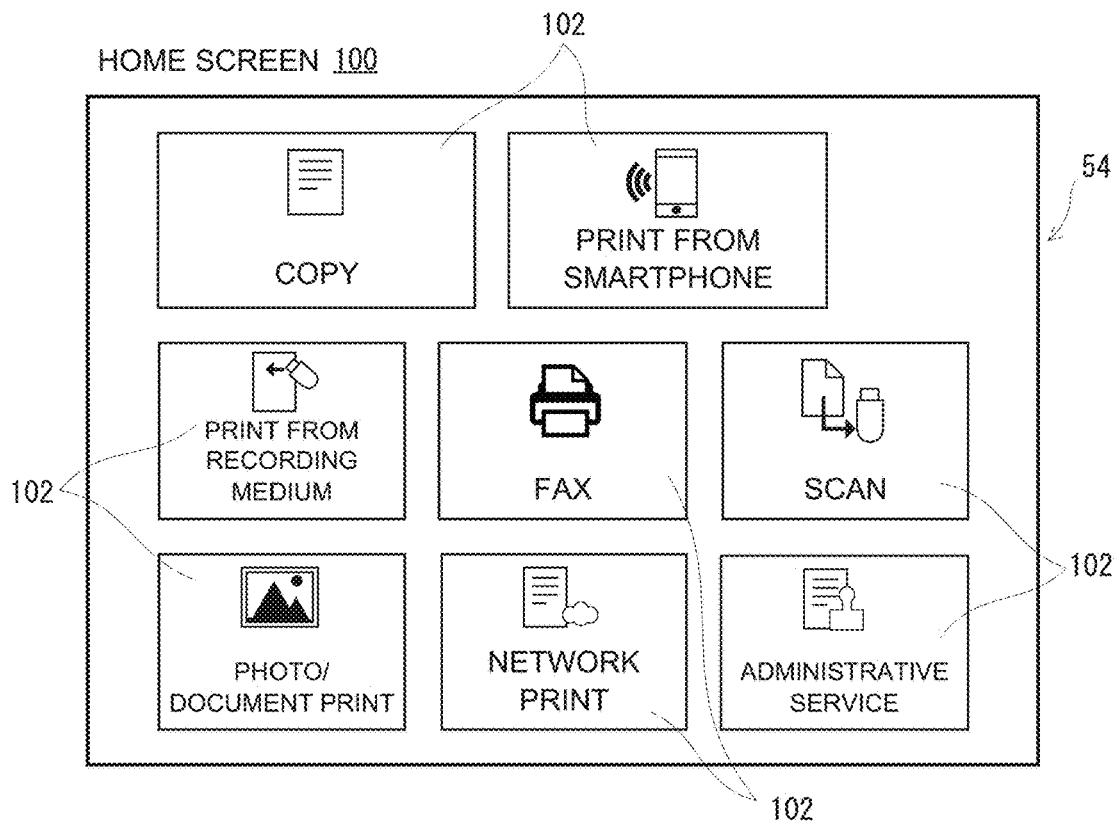
FIG. 4 is a schematic diagram illustrating an example of a home screen.

For example, when the main power of the image processing device 14 is turned on to be in a standby state where each function is executable, the display 54 of the image processing device 14 presents a home screen 100 as illustrated in FIG. 4.

The home screen 100 is an operation screen for selecting a service to be executed. The home screen 100 displays a plurality of selection icons 102 functioning as software keys to select a service.

Each of the selection icons 102 is assigned to a service that may be provided by the image processing device 14, such as "copy", "print from smartphone", "print from recording medium", "fax", "scan", "photo/document print", "network print", "administrative service", etc.

The "print from smartphone" service refers to a print service using image data stored in a mobile terminal such as a smartphone, the "print from recording medium" service refers to a print service using image data stored in a storage medium, and the "network print" service refers to a print service using image data transmitted from an external computer (a server for a network print service). Furthermore, "administrative service" refers to a print service for printing an administrative certificate. The copy service includes a service (normal copy service) for copying (duplicating) an image of an original such as a document on regular paper, a service (photo copy service) for copying a photo image on photo paper, etc.

When any of the selection icons 102 is operated on the home screen 100, that is, when a service is selected, the display 54 sequentially presents a plurality of operation screens for setting operation conditions of the selected service. A case where a copy service is selected is described below as an example.

Figure 5:
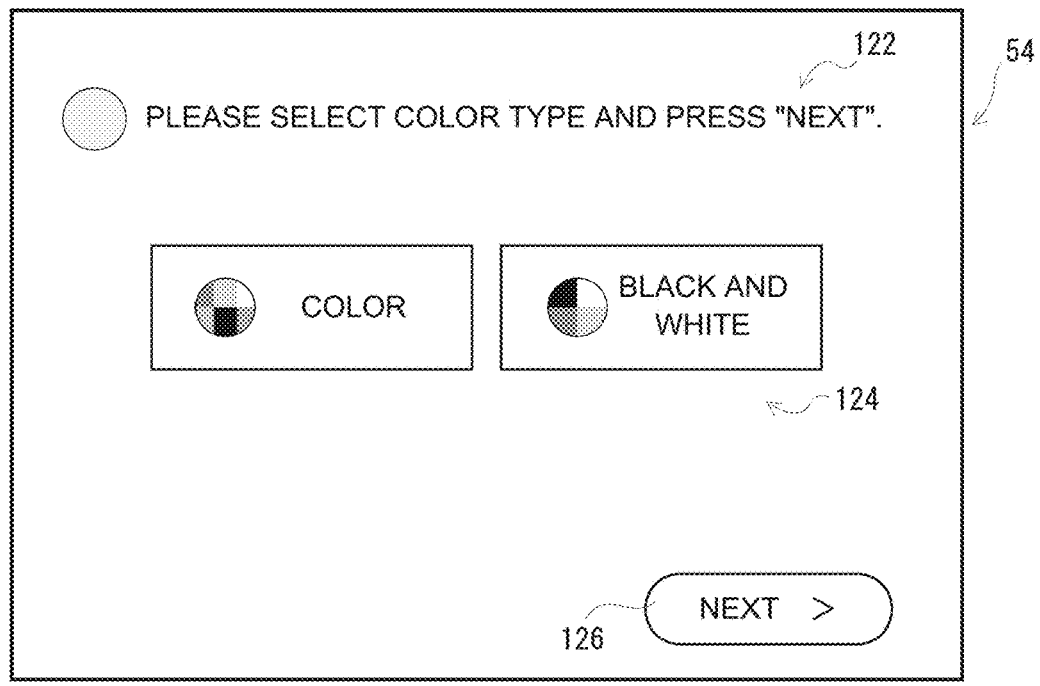
FIG. 5 is a schematic diagram illustrating an example of a first setting screen.

When the selection icon 102 assigned to the copy service is operated (the copy service is selected) on the home screen 100, the display 54 sequentially presents a plurality of operation screens (copy setting screens) for setting the operation conditions (copy conditions) of the copy service. A first setting screen 120 illustrated in FIG. 5 is an example of the copy setting screen and is one screen (e.g., a first screen displayed) among a plurality of operation screens for setting the operation conditions of the copy service.

The first setting screen 120 is a screen for setting a color mode (color condition) in the copy service and includes a notification text 122, a setting part 124, and a transition icon 126.

The notification text 122 is a message, such as "Please select color type and press 'Next'", prompting the user to set (select) the color condition in the copy service and to transition to the subsequent screen when the color condition has been set.

The setting part 124 is provided to set the color condition (color/black and white) in the copy service and includes a plurality of setting icons that are assigned to different color conditions (color/black and white). When any of these setting icons is operated, the color condition for the copy service is set.

The transition icon 126 is an operation icon for proceeding to the subsequent operation screen (screen transition). When the transition icon 126 is operated, the display 54 presents the subsequent operation screen of the previously presented operation screen.

For example, on the first setting screen 120, when the transition icon 126 is operated, the display 54 sequentially presents various operation screens for setting operation conditions (paper size, ratio, number of copies, etc.) of the copy service other than the color condition. When the operation conditions of the copy service assigned to the respective operation screens are set, the settings of the operation conditions of the copy service are completed, and then a start key provided as a software key or a hardware key is pressed, the copy service is executed in accordance with the operation conditions set on the respective setting screens.

Although the case where the copy service is selected is described above as an example, a plurality of operation screens for setting operation conditions is sequentially displayed in the same manner when a service other than the copy service is selected. Each of the operation screens for setting the operation conditions of the image processing device 14 is assigned to information (identification information) for identifying (specifying) each setting screen.

The identification information on a setting screen is, for example, a character string combining an alphabet and a number and includes a character (first code) indicating a service and a character (second code) indicating what number the setting screen is in a certain service, and the combination of the first code and the second code identifies the setting screen.

Here, a user unfamiliar with the image processing device 14 sometimes does not know service content or an operation method of the image processing device 14. A service for supporting such a user includes a user support service using a chatbot (chatbot service). A chat refers to real-time communication by text exchange, and a chatbot service is a service in which, by using a technique such as artificial intelligence, a chatbot automatically responds to (automatically gives an answer to) a user's inquiry (question) about an image processing device.

In a conventional chatbot service, a user unfamiliar with the image processing device 14 sometimes does not know what to input when inputting a question or inputs an unintended question. If the content of the question is inappropriate, the answer from the chatbot has the content unintended by the user, and there is room for improvements in terms of operability.

Therefore, according to the present embodiment, a user is supported by using data on an operation history (operation history data) (in accordance with operation history data) up to the time of activation of a chatbot service.

Figure 6:
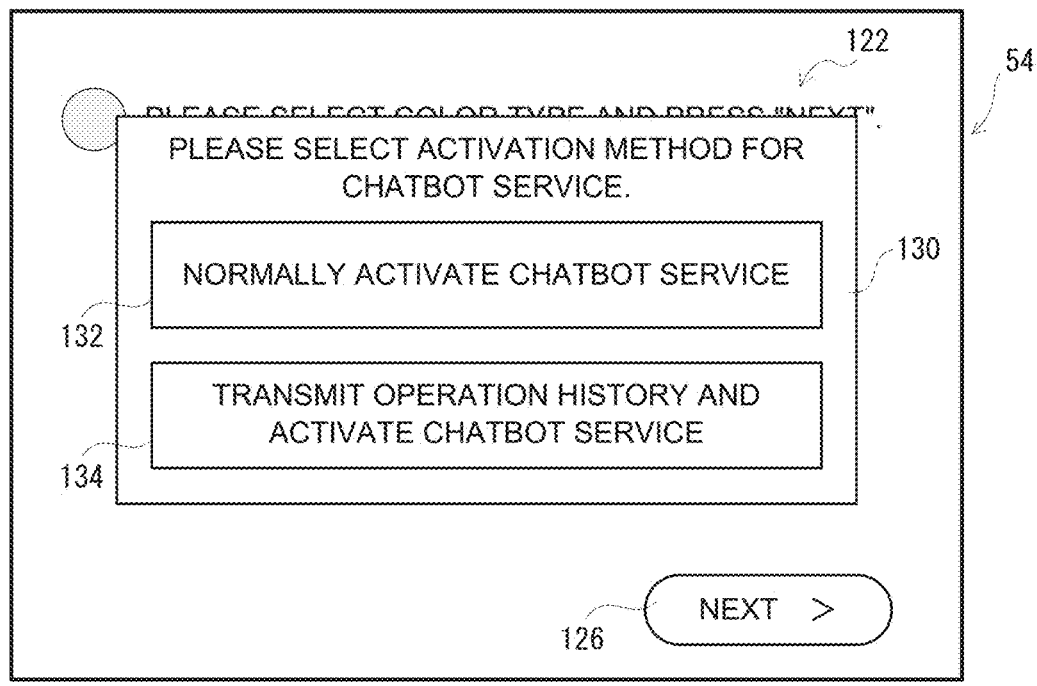
FIG. 6 is a schematic diagram illustrating an example of an operation screen including an activation window.

An operation example of a chatbot service according to the first embodiment is described below with reference to FIGS. 6 to 9. First, in the image processing system 10 according to the present embodiment, a predetermined operation (hereinafter may be referred to as "first activation operation") is performed to start (activate) the chatbot service or when an activation condition for the chatbot service is satisfied, the display 54 presents an activation window 130 for activating the chatbot service as illustrated in FIG. 6. The activation window 130 is displayed in a center portion of a display area of the display 54 such that it is superimposed on the front of the operation screen previously presented on the display 54. That is, the activation window 130 is displayed as a pop-up. FIG. 6 illustrates a case where the activation window 130 is displayed when the first setting screen 120 is displayed.

The first activation operation corresponds to a predetermined touch operation on a portion other than the operation icon (e.g., the setting part 124 and the transition icon 126) provided on each operation screen. The touch operation as the first activation operation includes long tap (long press) for a predetermined time or longer, slide (drag), flick, double touch, pinch in, pinch out, etc. An activation condition for the chatbot service corresponds to that, for example, the user remains within a predetermined range around the image processing device 14 and the non-operating state of any portions of the image processing device 14 has continued for a predetermined time period. It is determined whether the user remains within the predetermined range around the image processing device 14 in accordance with the output (distance data) of the person detection sensor 48.

The activation window 130 includes a first setting icon 132 and a second setting icon 134. The first setting icon 132 is assigned to the function for executing a chatbot service (normal chatbot service) that does not use operation history data, and the second setting icon 134 is assigned to the function for executing a chatbot service using operation history data. That is, in the chatbot service according to the present embodiment, the user may make a choice as to whether the operation history data is to be used. Operating either the first setting icon 132 or the second setting icon 134 may be referred to as a second activation operation. When a portion other than the display area of the activation window 130 is operated while the activation window 130 is displayed, the activation window 130 is hidden.

When either the first setting icon 132 or the second setting icon 134 is operated (when the second activation operation is received), the image processing device 14 activates the communicator 50, starts a wireless communication, and detects the mobile terminal 16 (communicable terminal) that exists in a wireless communicable range. Specifically, the communicable terminal refers to a terminal that may communicate directly with the image processing device 14 via a wireless communication without involving the network 18.

When the second setting icon 134 is operated, operation history data up to the time of activation of the chatbot service (the time when the activation window 130 is displayed or the time when the second setting icon 134 is operated) is generated. Conversely, when the first setting icon 132 is operated, no operation history data is generated. The operation history data includes the data of identification information of the setting screen presented on the display 54 of the image processing device 14 at the time of activation of the chatbot service and the data of content, or the like, of operation conditions that have been set before the activation of the chatbot service.

Figure 7:
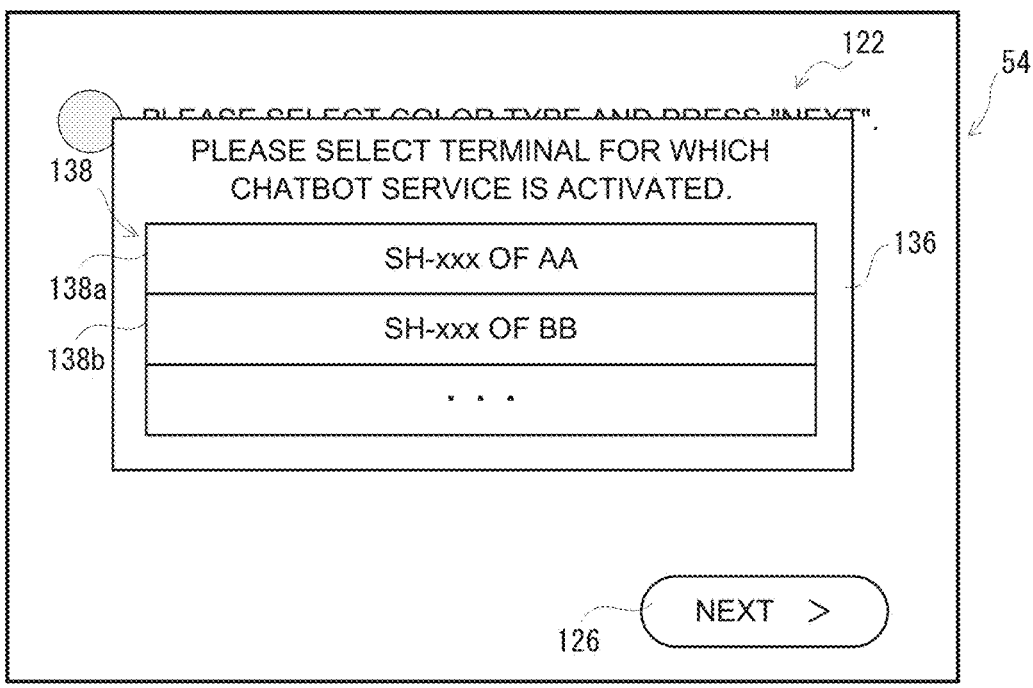
FIG. 7 is a schematic diagram illustrating an example of an operation screen including a terminal selection window.

When either the first setting icon 132 or the second setting icon 134 is operated and a communicable terminal is detected, a terminal selection window 136 for selecting a terminal for which the chatbot service is to be executed is displayed in place of the activation window 130, as illustrated in FIG. 7.

The terminal selection window 136 includes a selection icon 138 corresponding to a communicable terminal. When a plurality of communicable terminals is detected, the terminal selection window 136 includes (displays) the selection icons 138 corresponding to the respective communicable terminals. The selection icon 138 displays the terminal identification information for identifying the corresponding communicable terminal. For example, the terminal identification information is the owner's name, the model name, etc.

In the example illustrated in FIG. 7, two communicable terminals are detected, and two selection icons 138a, 138b corresponding to the two respective communicable terminals are displayed in the terminal selection window 136. The user may select a desired communicable terminal (e.g., the mobile terminal 16 possessed by the user), for which the chatbot service is to be executed, from the selection icons 138 displayed in the terminal selection window 136.

When the selection icon 138 is operated, the activation data for activating the chatbot service is wirelessly transmitted from the image processing device 14 to the communicable terminal (the mobile terminal 16 for execution) corresponding to the operated selection icon 138. The activation data includes the data for accessing a server (the server 12 according to the present embodiment) having the chatbot function (providing the chatbot service), such as Uniform Resource Locator (URL) data.

When the second setting icon 134 is operated in the activation window 130 and the operation history data is generated, the operation history data associated with the activation data, in addition to the activation data, is wirelessly transmitted from the image processing device 14 to the mobile terminal 16 for execution. Conversely, when the first setting icon 132 has been operated in the activation window 130 (no operation history data has been generated), no operation history data is transmitted.

Although not illustrated, the activation window 130 and the terminal selection window 136 may include an icon (cancel icon) for canceling the activation of the chatbot service.

When the mobile terminal 16 for execution receives (acquires) the activation data, the communication between the mobile terminal 16 for execution and the server 12 is started in accordance with the activation data. In other words, the access by the mobile terminal 16 for execution to the chatbot function provided by the server 12 is started. When the operation history data is associated with the activation data, the operation history data is transmitted from the mobile terminal 16 for execution to the server 12. When the server 12 acquires the operation history data, the operation history data is associated with the activated chat itself or the user who asks a question in that chat.

Figure 8:
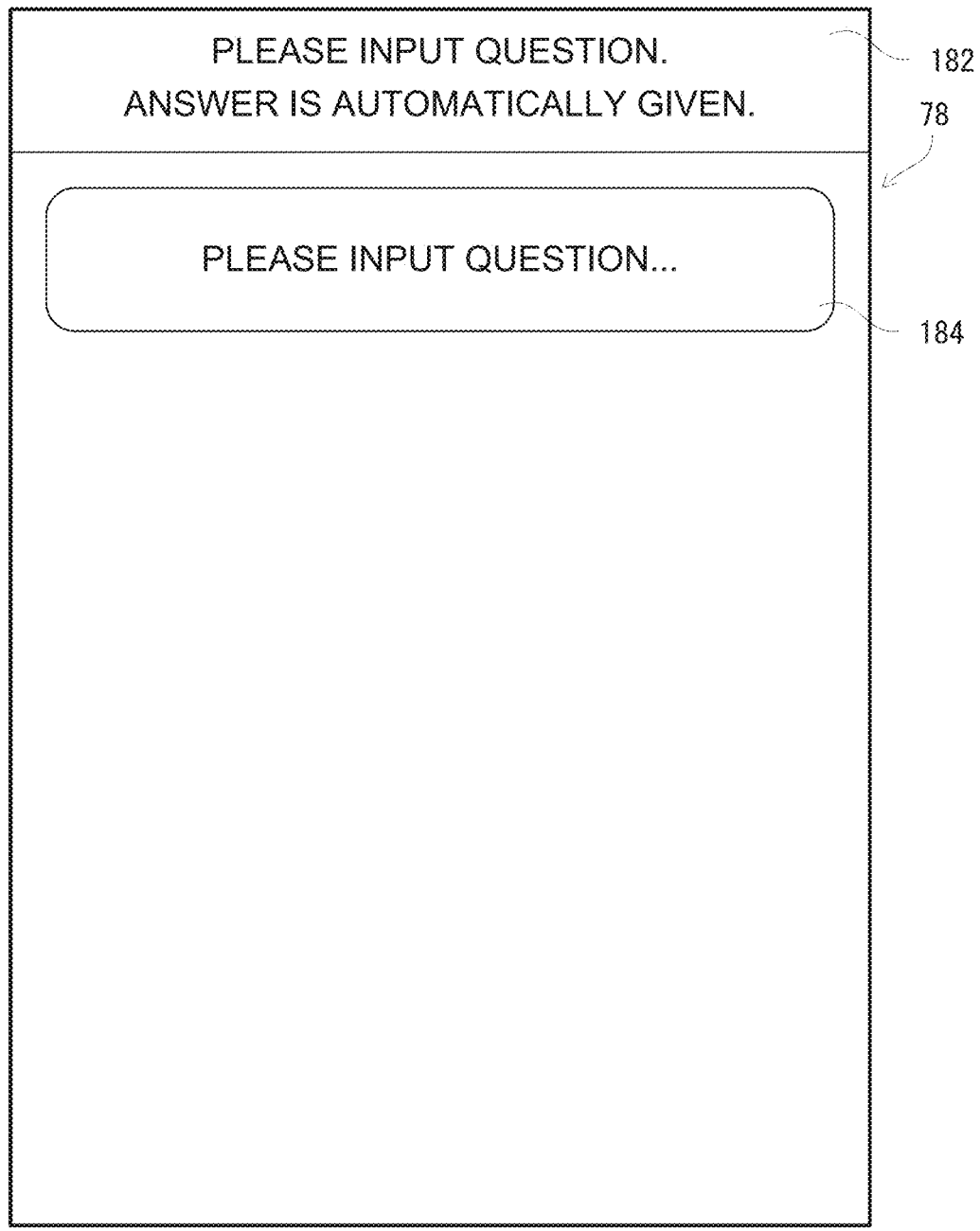
FIG. 8 is a schematic diagram illustrating an example of a chat screen.

Subsequently, the mobile terminal 16 for execution accesses a storage of the server 12 to acquire data (operation screen data) on an operation screen of the chatbot service. When the mobile terminal 16 for execution acquires the operation screen data of the chatbot service, the display 78 of the mobile terminal 16 for execution displays an operation screen (chat screen) 180 of the chatbot service, as illustrated in FIG. 8.

The chat screen 180 is a screen for exchanging text (conducting a chat) with a chatbot and includes a notification text 182 and a question input field (character input field) 184.

The notification text 182 is a message, such as "Please input question. Answer is automatically given.", prompting the user to input a question and notifying the user that the question will be answered automatically. The question input field 184 is an input box (text box) for the user to input the content of a question (question text). The question is confirmed when a predetermined operation (such as an operation of an enter key included in a character input application) for confirming the content of the question is received while the content of the question has been input in the question input field 184.

Figure 9:
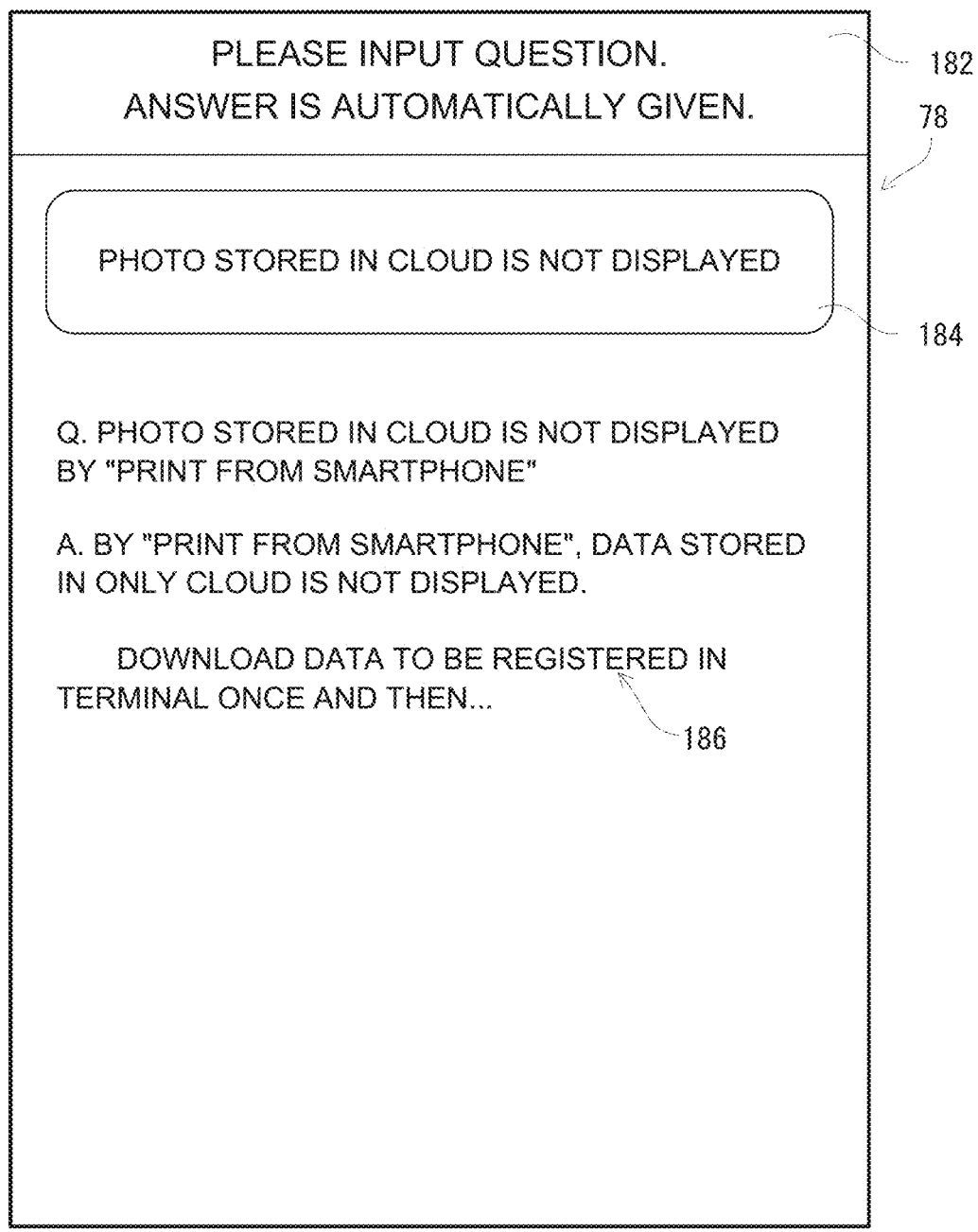
FIG. 9 is a schematic diagram illustrating an example of the chat screen after a question is input.

When the question is input in the question input field 184 and the question is confirmed, the data (question data) on the question is transmitted from the mobile terminal 16 for execution to the server 12, and an answer (answer text) to the question is generated by the server 12. When the answer to the question is generated, the data (answer data) on the answer is transmitted (returned) from the server 12 to the mobile terminal 16 that is the question source (the mobile terminal 16 for execution). As illustrated in FIG. 9, the mobile terminal 16 for execution displays an answer text 186 based on the answer data after receiving the answer data.

The description in Japanese Unexamined Patent Application Publication No. 2019-128914 by the present applicant may be referred to with regard to a method for automatically answering an input question by a chatbot. To explain briefly, first, possible question texts (registered texts) and answer texts to the respective registered texts are previously registered (stored) in a database. Then, a topic word, which is a subject or object of the question text, and a predicate corresponding to the topic word are extracted from the question text input by the user, and when the topic word is contained in the question text, a registered text associated with the user's question text is searched for by using, as search words, the topic word, the predicate, and an associated word of the topic word and the predicate so that the answer text for the registered text most highly associated with the search word is selected as an answer text for the user's question text.

According to the present embodiment, when the server 12 has acquired no operation history data, an answer is generated only based on the question text input by the user, as in the method described above. Conversely, when the server 12 has acquired the operation history data, an answer is generated based on not only the question text but the question text and the operation history data associated with the question text (or associated with the user who asked the question or the chat itself).

Specifically, when the server 12 has acquired the operation history data, the operation history data is analyzed, and the registered text is searched for based on not only the question text but the question text and the operation history data. For example, the service selected by the user at the time of activation of the chatbot service is specified based on the identification information on the setting screen included in the operation history data, and the service name of the specified service is added as a search word, a keyword (frequently questioned word) associated with the specified service is added as a search word, or the search range of a registered text is limited to the range associated with the specified service. A keyword associated with the operation condition may be added as a search word based on the details of the operation condition at the time of activation of the chatbot service included in the operation history data, or when the question text contains a word having a low association with the specified service or the like, the word having a low association with the specified service or the like may be replaced (modified) with a word having a high association with the specified service or the like.

In the example illustrated in FIG. 9, the question text input by the user is "Photo stored in cloud is not displayed", and it is difficult to specify the service being selected by the user based on only this question text. Here, when the chatbot service has been activated in a state where the service "print from smartphone" is being selected (in a state where the setting screen for setting an operation condition of the service "print from smartphone" is being displayed) and the server 12 has acquired the operation history data, the server 12 may search for a registered text by using, as search words, the word "print from smartphone" as the service name, the keyword associated with the service "print from smartphone", etc., in addition to the topic word, or the like, extracted from the question text. Therefore, an appropriate registered text may be selected depending on the operation status at the time of activation of the chatbot service, and an appropriate answer may be presented to the user.

The above-described operation of the image processing system 10 is performed when the CPU 22 of the image processing device 14 executes an image processing device control program stored in the RAM 24, the CPU 62 of the mobile terminal 16 executes a mobile terminal control program stored in the RAM 64, and the CPU 12$a$ of the server 12 executes a server control program stored in the RAM 12$b$. The specific processing is described below using a flowchart.

Figure 10:
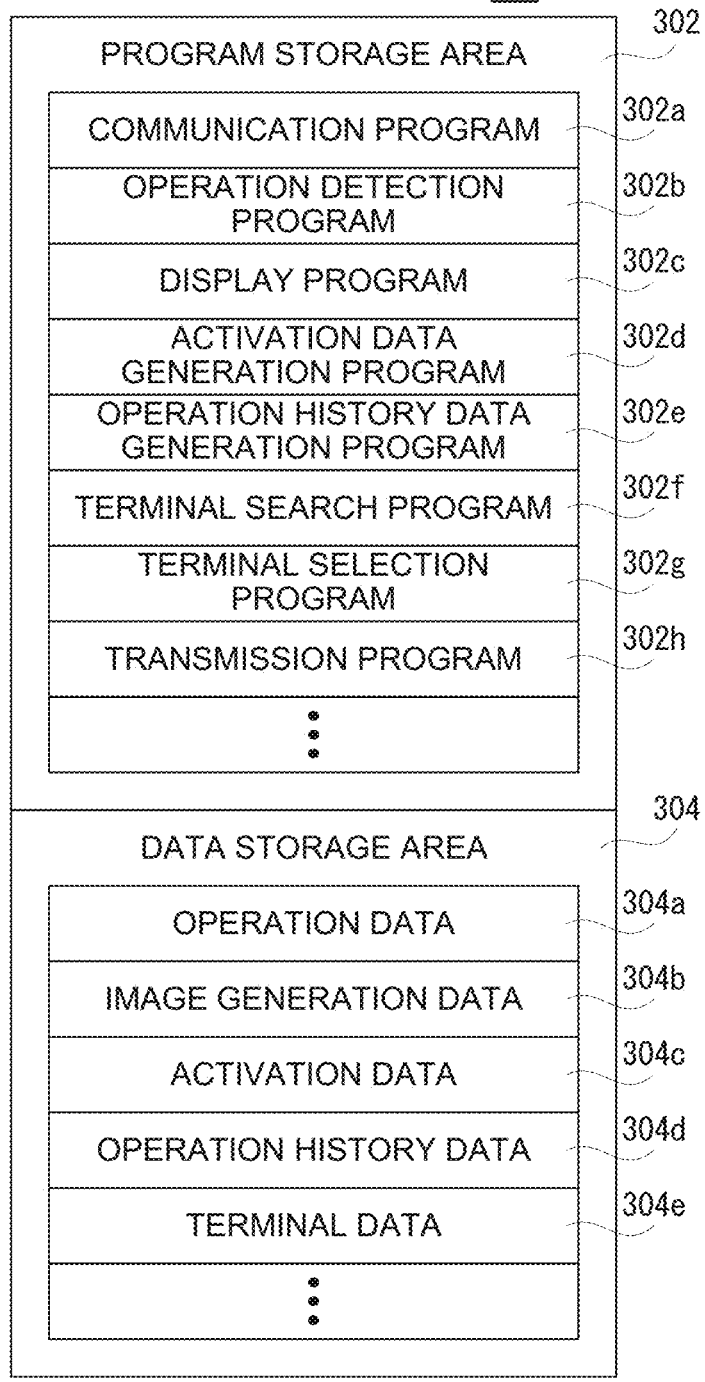
FIG. 10 is a schematic diagram illustrating an example of a memory map of a RAM of the image processing device illustrated in FIG. 2.

FIG. 10 is a schematic diagram illustrating an example of a memory map 300 of the RAM 24 of the image processing device 14 illustrated in FIG. 2. As illustrated in FIG. 10, the RAM 24 includes a program storage area 302 and a data storage area 304. The program storage area 302 of the RAM 24 stores the image processing device control program, as described above. The image processing device control program includes a communication program 302$a$, an operation detection program 302$b$, a display program 302$c$, an activation data generation program 302$d$, an operation history data generation program 302$e$, a terminal search program 302$f$, a terminal selection program 302$g$, and a transmission program 302$h$.

The communication program 302$a$ is a program to communicate (transmit and receive) data with an external computer such as the server 12 and the mobile terminal 16 or other devices via the network 18. The communication program 302$a$ is also a program to communicate directly with the mobile terminal 16 via a wireless communication.

The operation detection program 302$b$ is a program to detect a user's operation input to an operation button and a touch panel included in the input device 52. In accordance with the operation detection program 302$b$, the CPU 22 detects operation data or an operation signal caused by the user operation on the operation button or detects touch coordinate data input by an operation on the touch panel.

The display program 302$c$ is a program to generate display image data, i.e., screen data on various operation screens described above, by using the image generation data 304$b$ described below and output the display image data to the display 54.

The activation data generation program 302*d* is a program to generate activation data for activating a chatbot service in the mobile terminal 16 or the like.

The operation history data generation program 302*e* is a program to generate operation history data, which is data on the operation history of the image processing device 14 up to the time of activation of the chatbot service when an operation to execute the chatbot service using operation history data is received.

The terminal search program 302*f* is a program to activate the communicator 50 and search for the mobile terminal 16 (communicable terminal) that is capable of directly communicating with the image processing device 14 via a wireless communication.

The terminal selection program 302*g* is a program to select, in response to a user operation, the mobile terminal 16 for execution, for which the chatbot service is activated (executed), from among the mobile terminals 16 that are capable of communicating directly with the image processing device 14 via a wireless communication.

The transmission program 302*h* is a program to wirelessly transmit the activation data to the mobile terminal 16 for execution. The transmission program 302*h* is also a program to wirelessly transmit the activation data and the operation history data associated with the activation data to the mobile terminal 16 for execution as needed. To transmit and receive data, communication processing is executed in accordance with the communication program 302*a*.

Although not illustrated, the program storage area 302 also stores a code reading program to control the code reader 32 to extract a coded image from a captured image, which is captured by a laser scanner or a camera, and decode the extracted coded image, a paper sheet printing program to control the paper sheet printer 34 to print a character string, image, bar code, and the like, on a roll of paper, a photo printing program to control the photoprinter 36 to print an image on photo paper, a short-range communication program to control the short-range communicator 38 to perform data communication with a communication target (e.g., identification card, membership card, or electronic money medium), an image reading program to control the image reader 40 to read an image of an original and output an image signal (transmission image) corresponding to the read image, an image forming program to control the image former 42 to print a multicolor or monochromatic print image on paper in accordance with print data, a storage medium connection program to control writing of data to various recording media attached to the storage medium connector 44 and reading of data from various recording media, a program to set a fee for a service or the like in the image processing device 14, a program to control the money processor 46 to calculate an amount of input money, return a coin through the coin return slot 46*b* in accordance with the remaining amount of money obtained by subtracting the fee for a predetermined service, or the like, from the amount of input money, and return a bill through the bill input slot, a program to select and execute various functions provided by the image processing device 14, etc.

The data storage area 304 of the RAM 24 stores operation data 304*a*, image generation data 304*b*, activation data 304*c*, operation history data 304*d*, terminal data 304*e*, etc.

The operation data 304*a* is operation input data including operation data and/or touch coordinate data detected in accordance with the operation detection program 302*b*. The image generation data 304*b* is data such as polygon data or texture data for generating display image data corresponding to various screens to be presented on the display 54.

The activation data 304*c* is data generated in accordance with the activation data generation program 302*d* to activate the chatbot service in the mobile terminal 16. The operation history data 304*d* is data on the operation history of the image processing device 14 up to the time of activation of the chatbot service, which is generated in accordance with the operation history data generation program 302*e*. The terminal data 304*e* is data on a communicable terminal, which is capable of communicating directly with the image processing device 14 via a wireless communication, and data on the mobile terminal 16 for execution.

Although not illustrated, the data storage area 304 stores other types of data needed to execute the image processing device control program and includes a timer (counter) or register needed to execute the image processing device control program.

Figure 11:
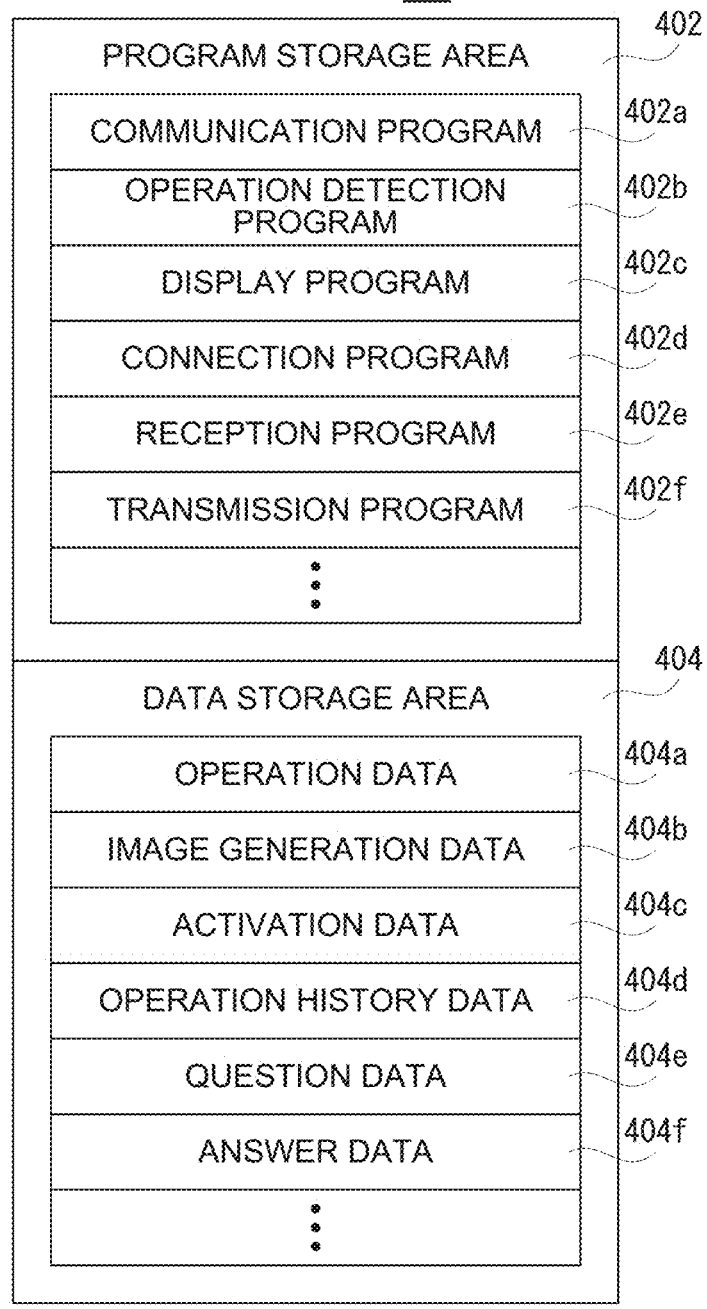
FIG. 11 is a schematic diagram illustrating an example of a memory map of a RAM of the mobile terminal illustrated in FIG. 3.

FIG. 11 is a schematic diagram illustrating an example of a memory map 400 of the RAM 64 of the mobile terminal 16 illustrated in FIG. 3. As illustrated in FIG. 11, the RAM 64 includes a program storage area 402 and a data storage area 404. The program storage area 402 of the RAM 64 stores the mobile terminal control program, as described above. The mobile terminal control program includes a communication program 402*a*, an operation detection program 402*b*, a display program 402*c*, a connection program 402*d*, a reception program 402*e*, and a transmission program 402*f*.

The communication program 402*a* is a program to communicate data with an external computer such as the server 12 and the image processing device 14 or other devices via the network 18. The communication program 402*a* is also a program to directly communicate with the image processing device 14 via a wireless communication. The operation detection program 402*b* is a program to detect touch coordinate data, or the like, input by an operation on the touch panel 76. The display program 402*c* is a program to generate screen data on various operation screens described above using the image generation data 404*b* described below and output the screen data to the display 78.

The connection program 402*d* is a program to connect (access) the server 12, which provides the chatbot service, in accordance with the activation data. That is, the connection program 402*d* is also a program to access the chatbot function included in the server 12 in accordance with the activation data.

The reception program 402*e* is a program to receive the activation data and the operation history data, or the like, associated with the activation data transmitted from the image processing device 14. The reception program 402*e* is also a program to receive answer data transmitted from the server 12. To receive data, communication processing is executed in accordance with the communication program 402*a*.

The transmission program 402*f* is a program to transmit question data to the server 12. The transmission program 402*f* is also a program to transmit the operation history data to the server 12 when the operation history data is associated with activation data. To transmit data, communication processing is executed in accordance with the communication program 402*a*.

Although not illustrated, the program storage area 402 also stores a program, or the like, to select and execute various functions provided by the mobile terminal 16.

The data storage area 404 of the RAM 84 stores operation data 404*a*, image generation data 404*b*, activation data 404*c*, operation history data 404*d*, question data 404*e*, answer data 404*f*, etc.

The operation data 404a is operation input data including touch coordinate data detected in accordance with the operation detection program 402b. The image generation data 404b is data such as polygon data or texture data for generating display image data corresponding to various screens presented on the display 78.

The activation data 404c is data for connecting to the server 12, which provides the chatbot service, and activating the chatbot service.

The operation history data 404d is data on the operation history of the image processing device 14 up to the time of activation of the chatbot service and is associated with the activation data 404c.

The question data 404e is data on a question input by the user in the chatbot service. The answer data 404f is data on an answer to the question input by the user and is transmitted from the server 12.

Although not illustrated, the data storage area 404 stores other types of data needed to execute the mobile terminal control program and includes a timer (counter) or register needed to execute the mobile terminal control program.

Figure 12:
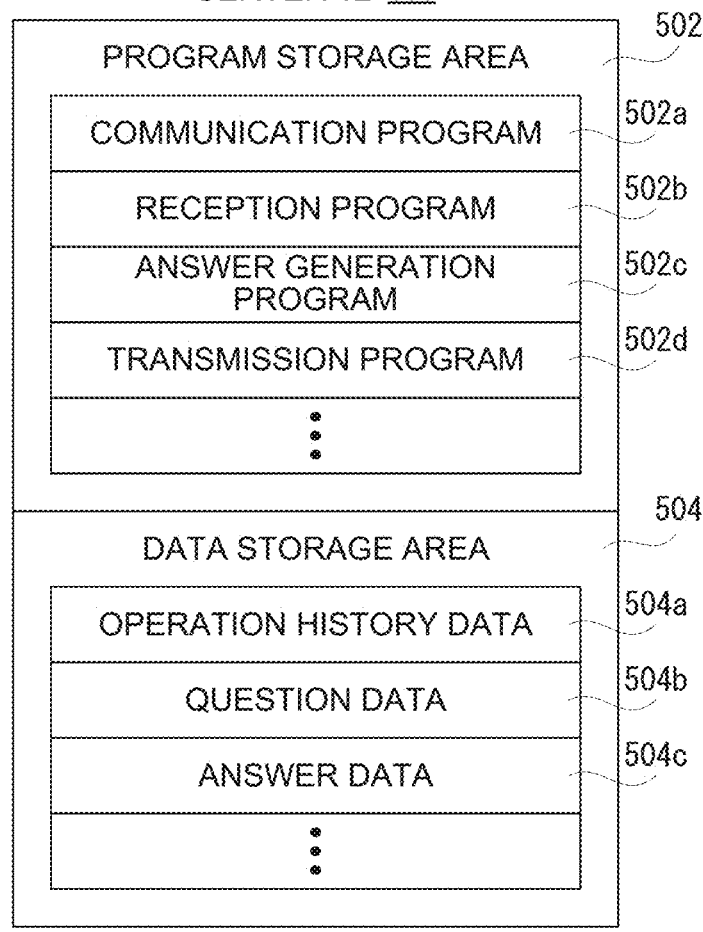
FIG. 12 is a schematic diagram illustrating an example of a memory map of a RAM of a server illustrated in FIG. 1.

FIG. 12 is a schematic diagram illustrating an example of a memory map 500 of the RAM 12b of the server 12 illustrated in FIG. 1. As illustrated in FIG. 12, the RAM 12b includes a program storage area 502 and a data storage area 504. The program storage area 502 of the RAM 12b stores the server control program, as described above. The server control program includes a communication program 502a, a reception program 502b, an answer generation program 502c, and a transmission program 502d.

The communication program 502a is a program to communicate data with an external computer such as the image processing device 14 and the mobile terminal 16 or other devices via the network 18.

The reception program 502b is a program to receive question data, or the like, transmitted from the mobile terminal 16. The reception program 502b is also a program to receive the operation history data transmitted from the mobile terminal 16. To receive data, communication processing is executed in accordance with the communication program 502a.

The answer generation program 502c is a program to automatically generate an answer to the question indicated by question data in accordance with the content of the question. The answer generation program 502c is also a program to, when there is the operation history data associated with the question (or the user who has asked the question), automatically generate an answer to the question indicated by the question data in accordance with the content of the question and the content of the operation history indicated by the operation history data.

The transmission program 502d is a program to transmit the answer data generated in accordance with the answer generation program 502c to the mobile terminal 16. To transmit data, communication processing is executed in accordance with the communication program 502a.

Although not illustrated, the program storage area 502 also stores a program, or the like, to select and execute various functions provided by the server 12.

The data storage area 504 of the RAM 12b stores operation history data 504a, question data 504b, answer data 504c, etc.

The operation history data 504a is data on the operation history of the image processing device 14 up to the time of activation of the chatbot service with regard to the user using the chatbot service when the chatbot service is activated.

The question data 504b is data on the question input by the user in the chatbot service and is transmitted from the mobile terminal 16. The answer data 504c is data on an answer to the question indicated by the received question data and is generated in accordance with the answer generation program 502c.

Although not illustrated, the data storage area 504 stores other types of data needed to execute the server control program and includes a timer (counter) or register needed to execute the server control program.

Figure 13:
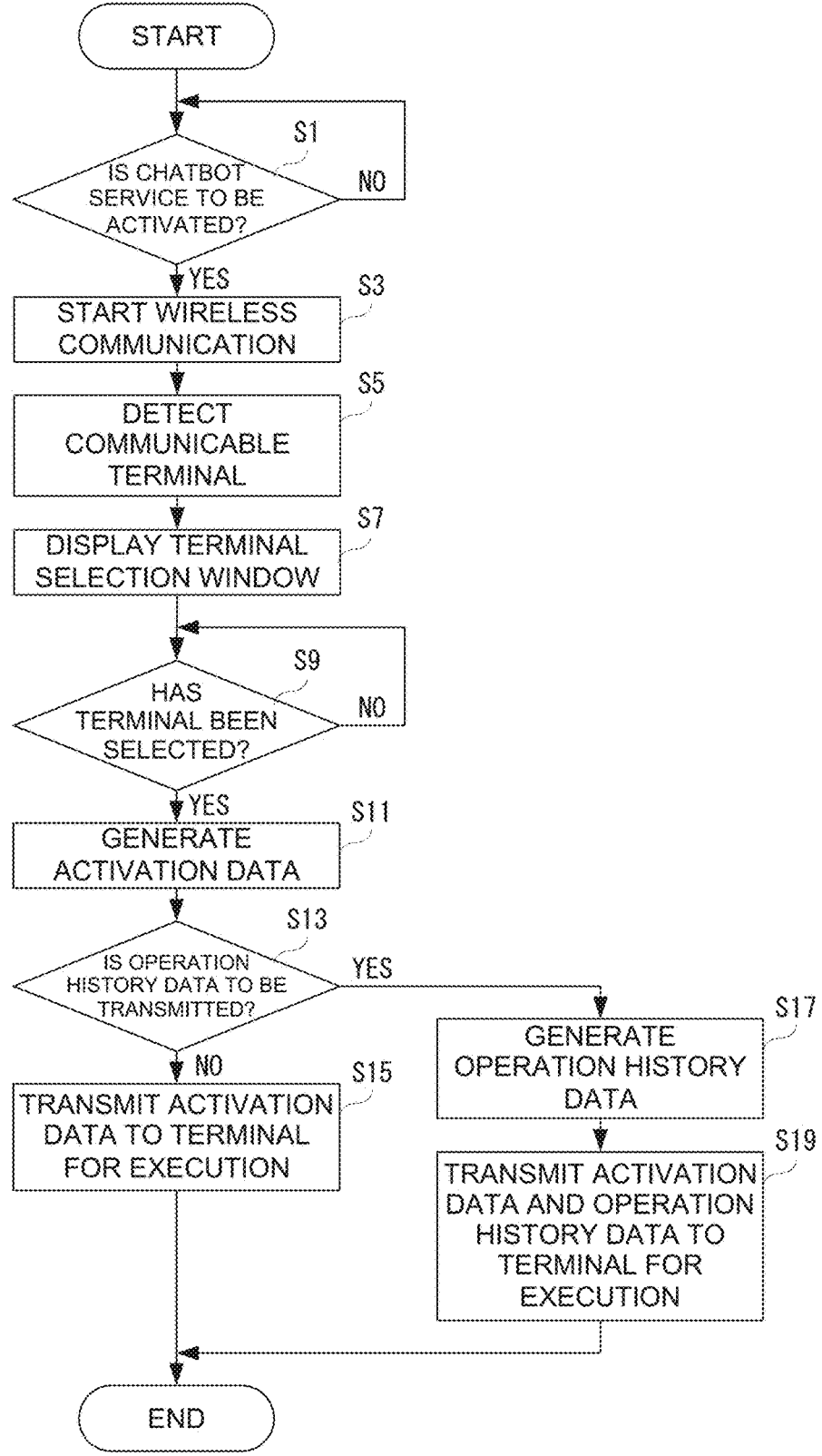
FIG. 13 is a flowchart illustrating an example of information processing of a CPU of the image processing device illustrated in FIG. 2.

FIG. 13 is a flowchart illustrating an example of information processing executed by the CPU 22 of the image processing device 14 (information processing of the image processing device 14) illustrated in FIG. 2. Information processing of the image processing device 14 is started when the first activation operation is received (when the activation window 130 is displayed).

As illustrated in FIG. 13, when the CPU 22 of the image processing device 14 starts information processing, it is determined whether the chatbot service is to be activated at Step S1. Here, it is determined whether the second activation operation has been received.

When it is "NO" at Step S1, that is, when it is determined that the chatbot service is not to be activated, the process returns to Step S1 Conversely, when it is "YES" at Step S1, that is, when it is determined that the chatbot service is to be activated, the communicator 50 is activated so that a wireless communication is started at Step S3, a communicable terminal, which is capable of directly communicating with the image processing device 14 via a wireless communication, is searched for at Step S5, the terminal selection window 136 including the selection icon 138 corresponding to the communicable terminal is displayed at Step S7, and then the process proceeds to Step S9.

At Step S9, it is determined whether the mobile terminal 16 for execution has been selected from among the communicable terminals. Here, it is determined whether the selection icon 138 included in the terminal selection window 136 has been operated. When it is "NO" at Step S9, that is, when it is determined that the mobile terminal 16 for execution has not been selected, the process returns to Step S9.

Conversely, when it is "YES" at Step S9, that is, when it is determined that the mobile terminal 16 for execution has been selected, activation data is generated at Step S11, and it is determined whether the operation history data is to be transmitted to the mobile terminal 16 for execution at Step S13. Here, it is determined whether the second setting icon 134 has been operated in the activation window 130.

When it is "NO" at Step S13, that is, when it is determined that the operation history data is not to be transmitted to the mobile terminal 16 for execution, the activation data is transmitted to the mobile terminal 16 for execution at Step S15, and then the information processing is terminated.

Conversely, when it is "YES" at Step S13, that is, when it is determined that the operation history data is to be transmitted to the mobile terminal 16 for execution, the operation history data indicating the operation history up to the time of activation of the chatbot service is generated at Step S17, the activation data and the operation history data are transmitted to the mobile terminal 16 for execution at Step S19, and then the information processing is terminated.

Figure 14:
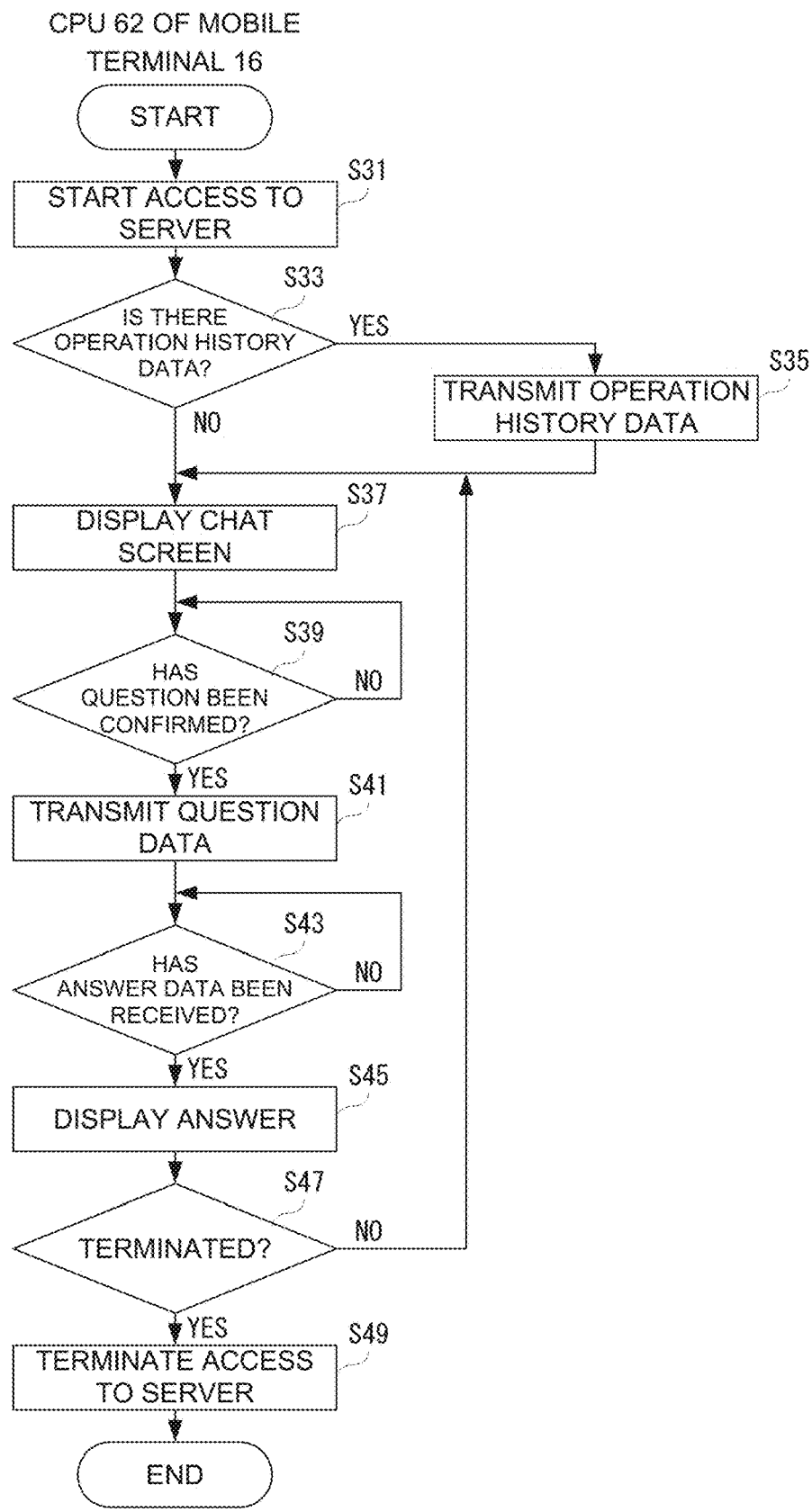
FIG. 14 is a flowchart illustrating an example of information processing of a CPU of the mobile terminal illustrated in FIG. 3.

FIG. 14 is a flowchart illustrating an example of information processing of the CPU 62 of the mobile terminal 16 (information processing of the mobile terminal 16). Information processing of the mobile terminal 16 is started when the activation data is received. As illustrated in FIG. 14, when the CPU 62 of the mobile terminal 16 starts information processing, an access to the server 12, which provides the chatbot service, is started at Step S31, and it is determined whether there is operation history data associated with the activation data at Step S33.

When it is "NO" at Step S33, that is, when it is determined that there is no operation history data associated with the activation data, the process proceeds to Step S37 described below. Conversely, when it is "YES" at Step S33, that is, when it is determined that there is operation history data associated with the activation data, the operation history data is transmitted to the server 12 at Step S35, and then the process proceeds to Step S37.

Subsequently, the operation screen (chat screen) for the chatbot service is presented on the display 78 in accordance with the data on the operation screen for the chatbot service, acquired from the server 12, at Step S37, and it is determined whether the question has been confirmed at Step S39. Here, it is determined whether a question has been input in the question input field 184 and an operation for confirming the question has been received.

When it is "NO" at Step S39, that is, when it is determined that the question has not been confirmed, the process returns to Step S39. Conversely, when it is "YES" at Step S39, that is, when it is determined that the question has been confirmed, the data on the question (question data) is transmitted to the server 12 at Step S41, and it is determined whether answer data has been received at Step S43.

When it is "NO" at Step S43, that is, when it is determined that no answer data has been received, the process returns to Step S43. Conversely, when it is "YES" at Step S43, that is, when it is determined that answer data has been received, the answer indicated by the answer data is presented on the display 78 at Step S45, and it is determined whether the chatbot service is to be terminated at Step S47.

When it is "NO" at Step S47, that is, when it is determined that the chatbot service is not to be terminated (to be continued), the process returns to Step S37. Conversely, when it is "YES" at Step S47, that is, when it is determined that the chatbot service is to be terminated, the access to the server 12 is terminated at Step S49, and the information processing is terminated.

Figure 15:
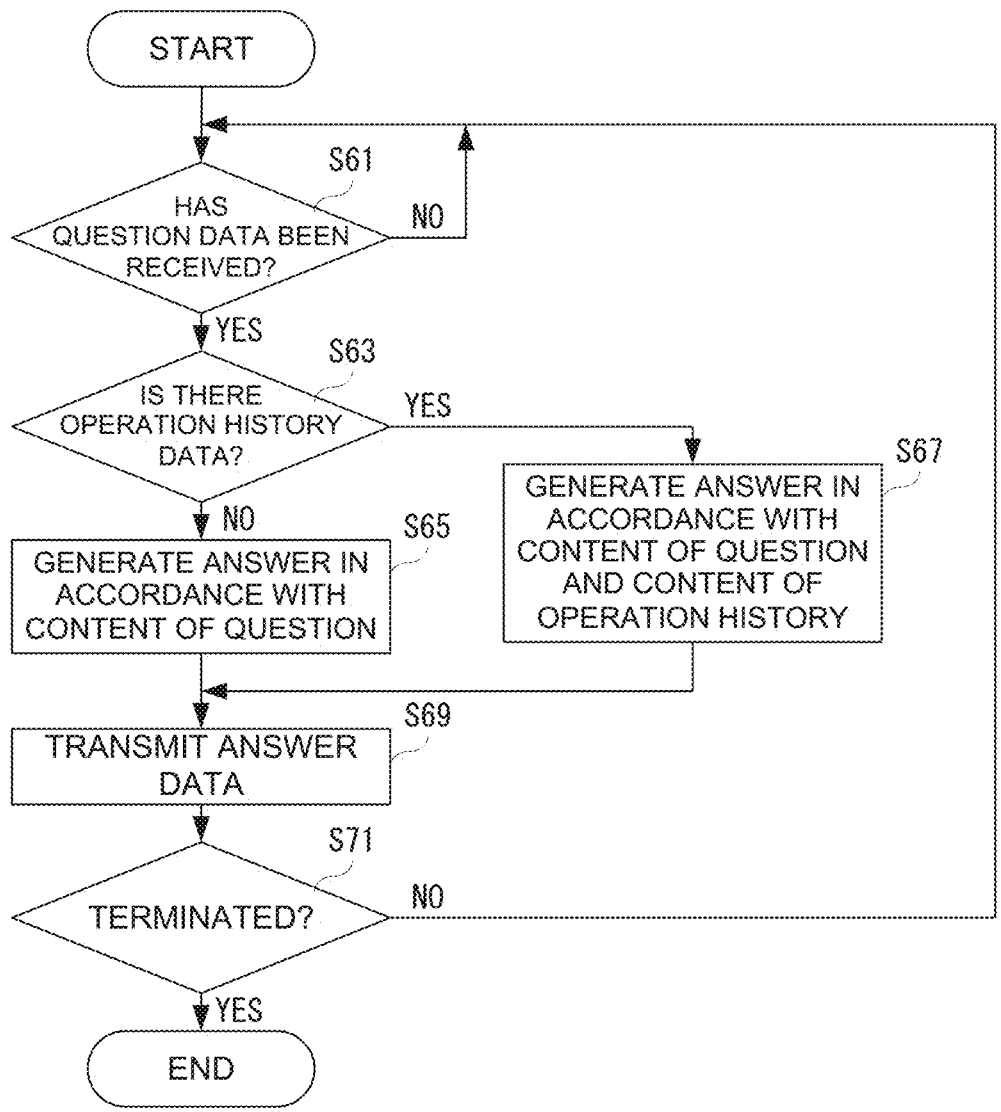
FIG. 15 is a flowchart illustrating an example of an answering process of a CPU of the server illustrated in FIG. 1.

FIG. 15 is a flowchart illustrating an example of an answering process of the CPU 12a of the server 12. The answering process is started when there is an access from the mobile terminal 16. As illustrated in FIG. 15, when the CPU 12a of the server 12 starts the answering process, it is determined whether question data has been received at Step S61.

When it is "NO" at Step S61, that is, when it is determined that no question data has been received, the process returns to Step S61. Conversely, when it is "YES" at Step S61, that is, when it is determined that question data has been received, it is determined whether there is operation history data at Step S63.

When it is "NO" at Step S63, that is, when it is determined that there is no operation history data, an answer is generated in accordance with the content of the question indicated by the question data at Step S65, and then the process proceeds to Step S69 described below.

Conversely, when it is "YES" at Step S63, that is, when it is determined that there is operation history data, an answer is generated in accordance with the content of the question indicated by the question data and the content of the operation history indicated by the operation history data in the manner described above at Step S67, and then the process proceeds to Step S69.

Subsequently, the data (answer data) on the generated answer is transmitted to the mobile terminal 16 at Step S69, and it is determined whether the answering process is to be terminated at Step S71. Here, it is determined whether there is no more access from the mobile terminal 16. When it is "NO" at Step S71, that is, when it is determined that the answering process is not to be terminated, the process returns to Step S61. Conversely, when it is "YES" at Step S71, that is, when it is determined that the answering process is to be terminated, the answering process is terminated.

According to the first embodiment, an answer is generated in accordance with the data on the operation history up to the time of activation of the chatbot service in addition to the content of the question input by the user so that an appropriate answer may be presented to the user and the operability may be improved.

Second Embodiment

The image processing system 10 according to a second embodiment is the same as that in the first embodiment except that a predictive conversion candidate is displayed when the user inputs the content of the question to the question input field 184, and therefore the content different from that of the first embodiment is described and duplicated descriptions are omitted.

Figure 16:
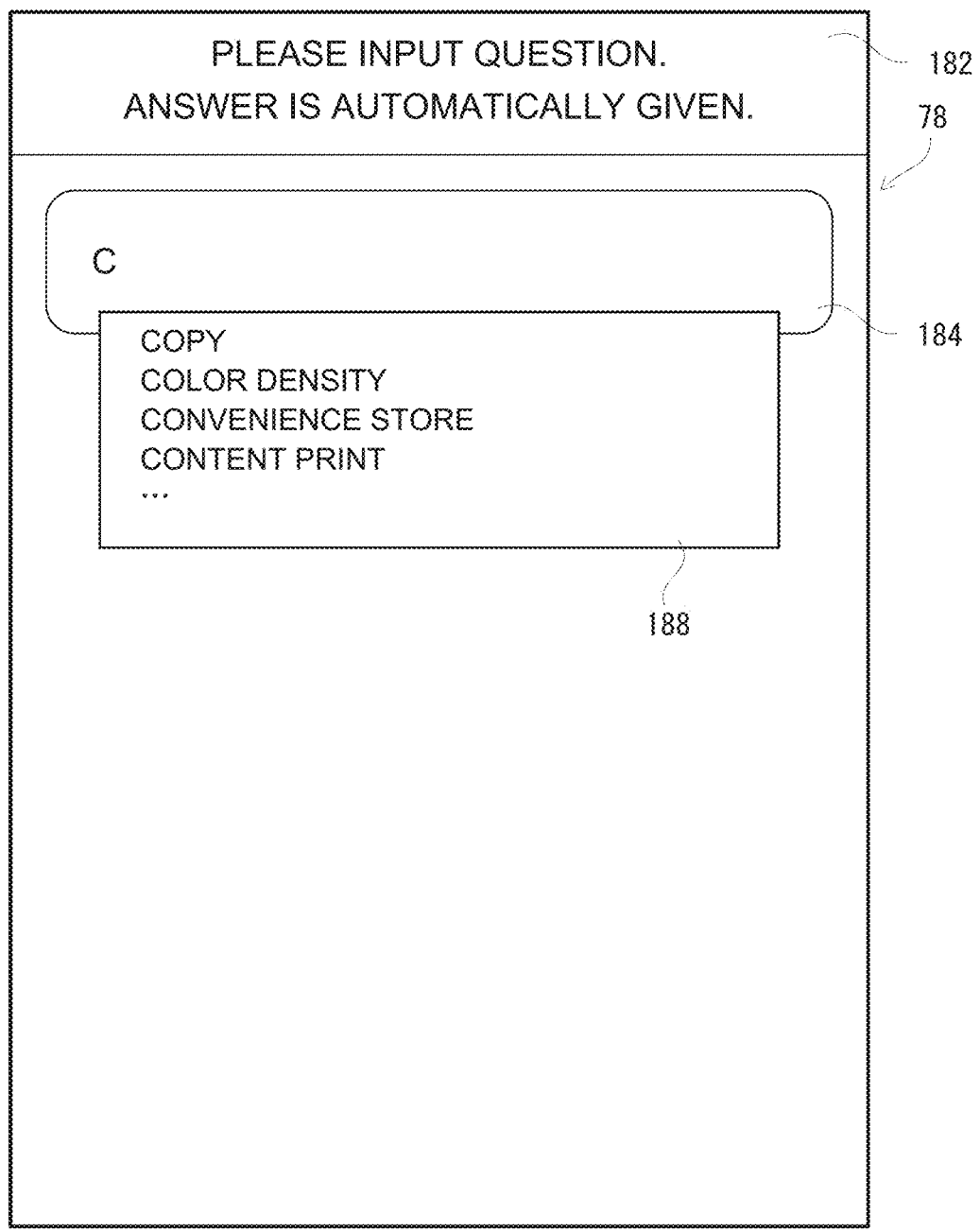
FIG. 16 is a schematic diagram illustrating an example of the chat screen according to a second embodiment.

FIG. 16 is a schematic diagram illustrating an example of the chat screen 180 according to the second embodiment. As illustrated in FIG. 16, according to the second embodiment, when the server 12 has acquired the operation history data, the chat screen 180 displays a candidate window 188 including a predictive conversion candidate word. For example, when some character is input in the question input field 184, a predictive conversion candidate word including the character input in the question input field 184 is displayed. That is, a predictive conversion candidate is presented to the user. When a predetermined time (e.g., 30 to 90 seconds) has elapsed from the time when the chat screen 180 is displayed, a predictive conversion candidate word is displayed regardless of whether a character is input in the question input field 184.

Data on a predictive conversion candidate word is generated by the server 12 and transmitted to the mobile terminal 16. According to the present embodiment, a word having a high association with the content of the service selected by the user or the content of the operation condition at the time of activation of the chatbot service is set as a predictive conversion candidate word. Specifically, a word including a keyword associated with the content of the service selected by the user or the content of the operation condition at the time of activation of the chatbot service is set as a predictive conversion candidate word. The setting is specified such that a word having a higher association with the content of the service selected by the user or the content of the operation condition at the time of activation of the chatbot service is in an upper rank as a predictive conversion candidate.

According to the second embodiment, in order to perform the above-described operation, the server control program includes a predictive conversion candidate setting program to set data (predictive conversion candidate data) on a predictive conversion candidate word in accordance with the content of the operation history indicated by the operation history data. The transmission program 502d included in the server control program is also a program to transmit the predictive conversion candidate data to the mobile terminal 16.

The data storage area 504 of the RAM 12b of the server 12 and the data storage area 404 of the RAM 64 of the mobile terminal 16 each store the predictive conversion candidate data.

The reception program 402e included in the mobile terminal control program is also a program to receive the predictive conversion candidate data transmitted from the server 12. The mobile terminal control program also includes a predictive conversion candidate display program to display the predictive conversion candidate word (a presentation program to present the predictive conversion candidate to the user) in accordance with the predictive conversion candidate data.

The answering process according to the second embodiment is described below using a flowchart, in which the same process as the answering process described in the first embodiment is denoted by the same reference numeral, and a description is omitted or a brief description is given for duplicated details.

Figure 17:
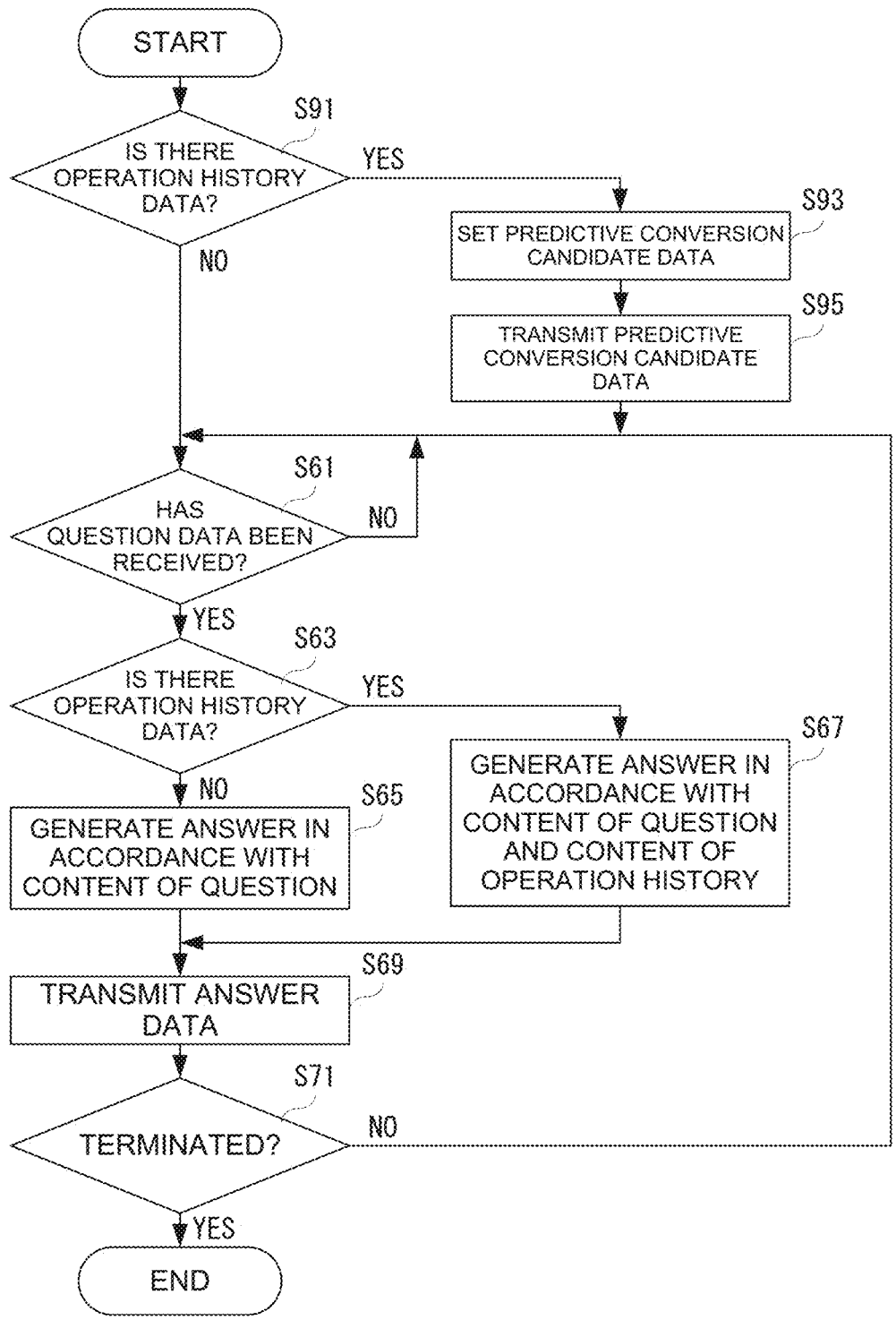
FIG. 17 is a flowchart illustrating an example of an answering process according to the second embodiment.

FIG. 17 is a flowchart illustrating an example of the answering process according to the second embodiment. As illustrated in FIG. 17, when the CPU 12a of the server 12 starts the answering process, it is determined whether there is operation history data at Step S91. When it is "NO" at Step S91, the process proceeds to Step S61. Conversely, when it is "YES" at Step S91, a predictive conversion candidate is set in accordance with the content of the operation history indicated by the operation history data at Step S93, the data on the predictive conversion candidate (predictive conversion candidate data) is transmitted to the mobile terminal 16 at Step S95, and the process proceeds to Step S61.

As the content of the processing after Step S61 is the same as that in the first embodiment, detailed descriptions are omitted. As the information processing of the image processing device 14 and the information processing of the mobile terminal 16 are the same as those in the first embodiment, descriptions are omitted.

According to the second embodiment, the predictive conversion candidate word is displayed when the user inputs the content of the question, which may reduce user's input errors.

Third Embodiment

The image processing system 10 according to a third embodiment is the same as that in the first embodiment except that a list of expected questions is displayed when the user inputs the content of the question to the question input field 184, and therefore the content different from that in the first embodiment is described and duplicated descriptions are omitted.

Figure 18:
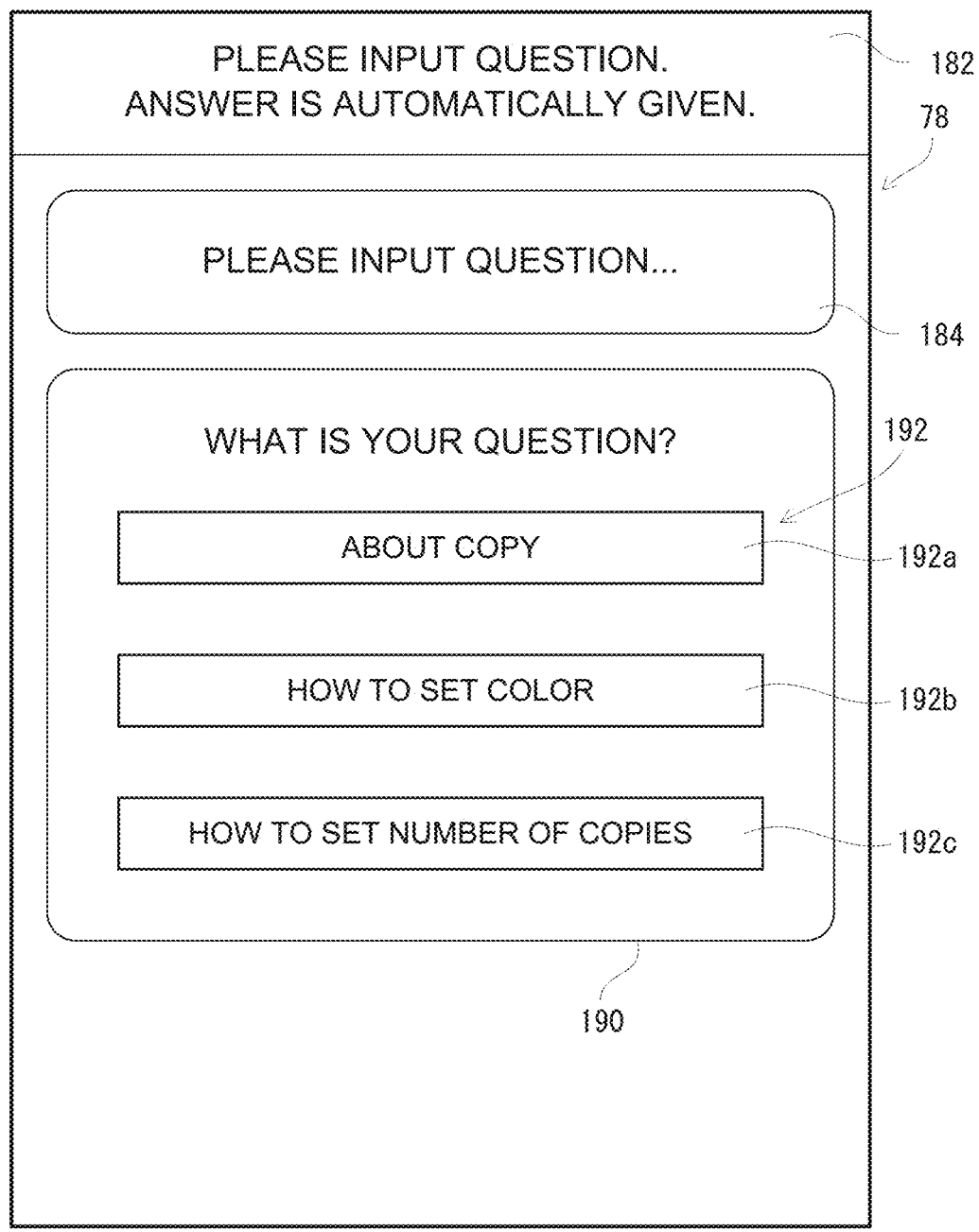
FIG. 18 is a schematic diagram illustrating an example of the chat screen according to a third embodiment.

FIG. 18 is a schematic diagram illustrating an example of the chat screen 180 according to the third embodiment. As illustrated in FIG. 18, according to the third embodiment, when the server 12 has acquired the operation history data, the chat screen 180 displays an expected question window 190. The expected question window 190 displays a list of a plurality of selection icons 192 corresponding to questions (hereinafter may be referred to as "expected questions") that are highly associated with the content of the service selected by the user and/or the content of the operation condition. Data on the expected question is generated by the server 12 and transmitted to the mobile terminal 16.

The expected questions correspond to, for example, questions having the content including a keyword associated with the content of the service selected by the user or the content of the operation condition or questions that are frequently asked in the service selected by the user. For example, when the copy service is selected, the expected question window 190 displays selection icons 192a to 192c corresponding to expected questions associated with the copy service, such as questions about the copy service in general, questions about how to set the color mode, and questions about how to set the number of copies.

When the selection icon 192 is operated, the question text of the expected question corresponding to the operated selection icon 192 is automatically input in the question input field 184. The content automatically input in the question input field 184 may be manually modified by the user. Therefore, the question text of the expected question may be confirmed without change, or the question may be confirmed after the question text of the expected question is partially modified.

The selection icon 192 having rough content and corresponding to the expected question may be displayed when the expected question window 190 is first displayed, and when the selection icon 192 is operated, the selection icon 192 corresponding to a more specific (more detailed) expected question may be further displayed without inputting the question text.

According to the third embodiment, in order to perform the above-described operation, the server control program includes an expected question setting program to set data on an expected question (expected question data) in accordance with the content of the operation history indicated by the operation history data. The transmission program 502d included in the server control program is also a program to transmit the expected question data to the mobile terminal 16.

The reception program 402e included in the mobile terminal control program is also a program to receive the expected question data transmitted from the server 12. The mobile terminal control program also includes an expected question display program to display the expected question window 190 and the selection icon 192 corresponding to the expected question included therein in accordance with the expected question data when the user inputs the content of the question in the question input field 184.

The answering process according to the third embodiment is described below using a flowchart, in which the same process as the answering process described in the first embodiment is denoted by the same reference numeral, and a description is omitted or a brief description is given for duplicated details.

Figure 19:
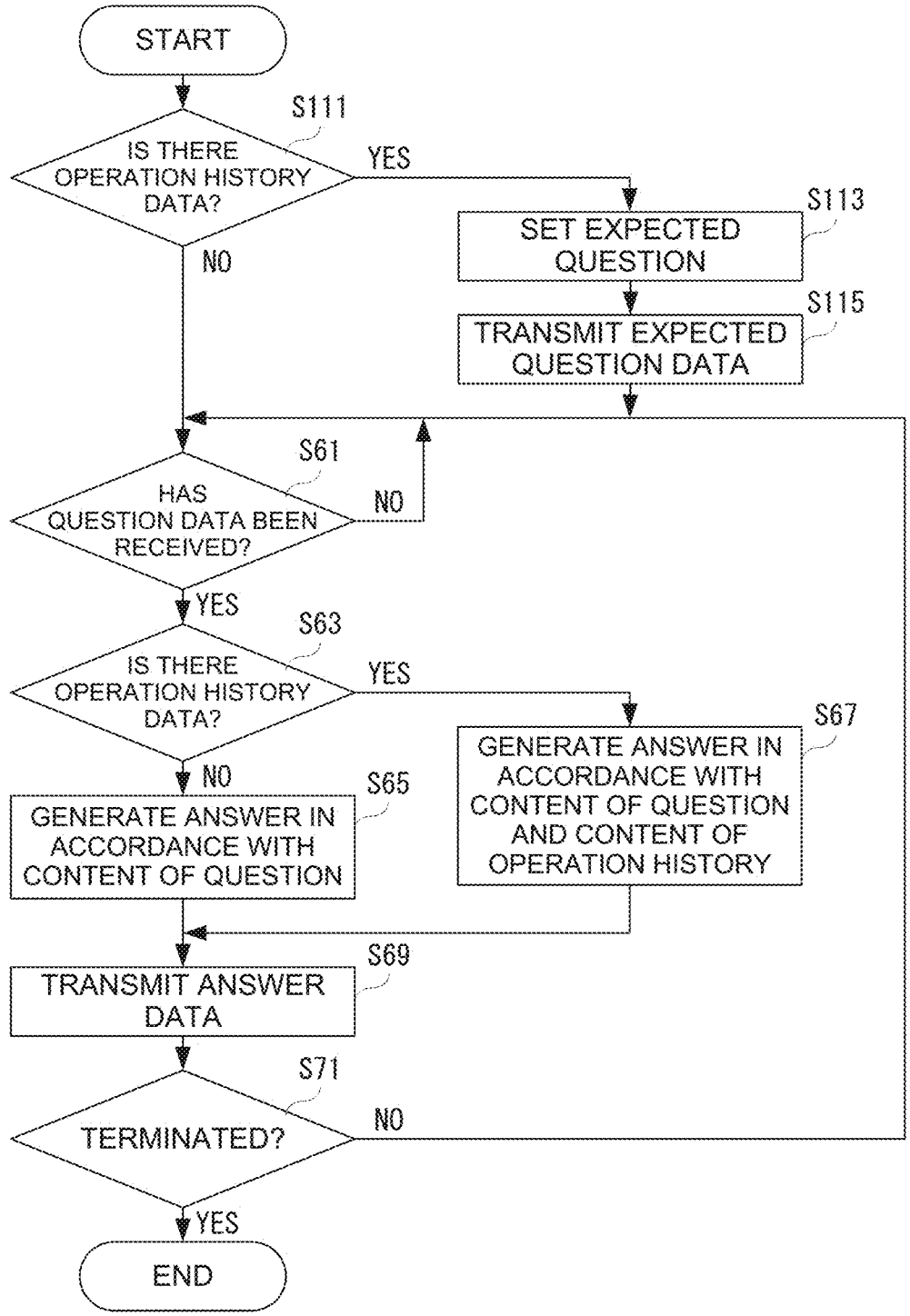
FIG. 19 is a flowchart illustrating an example of an answering process according to the third embodiment.

FIG. 19 is a flowchart illustrating an example of the answering process according to the third embodiment. As illustrated in FIG. 19, when the CPU 12a of the server 12 starts the answering process, it is determined whether there is operation history data at Step S111. When it is "NO" at Step S111, the process proceeds to Step S61. Conversely, when it is "YES" at Step S111, the expected question is set in accordance with the content of the operation history indicated by the operation history data at Step S113, the data (expected question data) on the expected question is transmitted to the mobile terminal 16 at Step S115, and the process proceeds to Step S61.

As the content of the processing after Step S61 is the same as that in the first embodiment, detailed descriptions are omitted. As the information processing of the image processing device 14 and the information processing of the mobile terminal 16 are the same as those in the first embodiment, descriptions are omitted.

According to the third embodiment, the list of expected questions is displayed when the user inputs the content of the question in the question input field 184, which may reduce user's input errors.

According to the third embodiment, the question text of the expected question may be modified, which enables flexible adaptation to the user.

The aspect described in the third embodiment may be adopted in combination with the second embodiment.

Fourth Embodiment

The image processing system 10 according to a fourth embodiment is the same as that in the first embodiment except for the different method for transmitting the activation data and the operation history data from the image processing device 14 to the mobile terminal 16 for execution, and therefore the content different from that in the first embodiment is described and duplicated descriptions are omitted.

Figure 20:
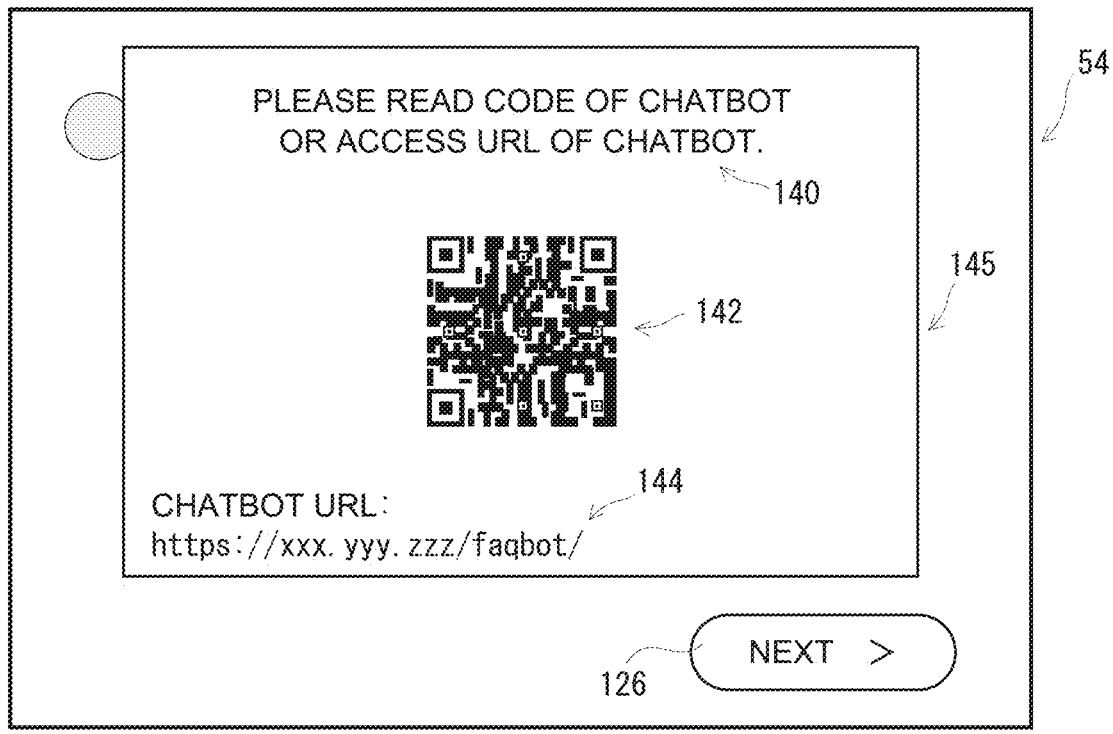
FIG. 20 is a schematic diagram illustrating an example of an operation screen including an activation window according to a fourth embodiment.

According to the fourth embodiment, as illustrated in FIG. 20, a connection window 145 is presented on the display 54 when the first activation operation is performed to activate the chatbot service. The connection window 145 is displayed as a pop-up in a center portion of the display area of the display 54 such that it is superimposed on the front of the operation screen previously presented on the display 54.

The connection window 145 displays a notification text 140, a coded image 142, and connection destination information 144.

The notification text 140 is a message such as "Please read code of chatbot or access URL of chatbot.", promoting reading of the coded image 142 by the mobile terminal 16 or access to the connection destination indicated by the connection destination information 144. The connection destination information 144 includes, for example, a character string indicating a URL of the server 12 that provides the chatbot service.

The coded image 142 is, for example, a barcode or a two-dimensional code. The activation data and/or the operation history data is embedded in the coded image 142.

A predetermined application for reading the coded image 142 is activated in the mobile terminal 16 while the display 54 presents the connection window 145, and after the camera 72 captures the coded image 142, the mobile terminal 16 extracts the coded image 142 from the captured image and decodes the extracted coded image 142.

After decoding the coded image 142, the mobile terminal 16 acquires the activation data and/or the operation history data embedded in the coded image 142. After acquiring the activation data, the mobile terminal 16 starts access to the server 12 in accordance with the activation data. When the operation history data is embedded in the coded image 142, the mobile terminal 16 transmits the operation history data to the server 12.

According to the fourth embodiment, in order to perform the above-described operation, the server control program includes a coded image generation program to generate a coded image in which the activation data and/or the operation history data is embedded.

The mobile terminal control program includes a capturing program to capture an image with the camera 72 and a decoding program to extract the coded image 142 from the captured image and decode the extracted coded image 142.

The information processing of the image processing device 14 is described below using a flowchart, in which the same process as the information processing of the image processing device 14 described in the first embodiment is denoted by the same reference numeral, and a description is omitted or a brief description is given for duplicated details.

Figure 21:
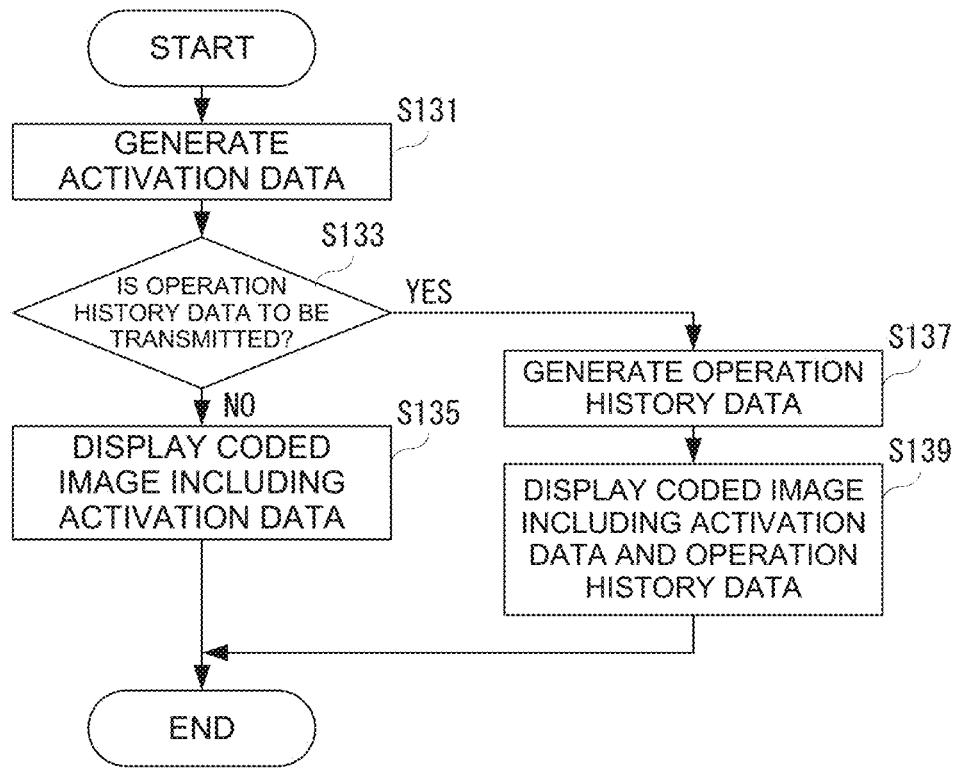
FIG. 21 is a flowchart illustrating an example of information processing of the image processing device according to the fourth embodiment.

FIG. 21 is a flowchart illustrating an example of information processing of the image processing device 14 according to the fourth embodiment. As illustrated in FIG. 21, when the CPU 22 of the image processing device 14 starts information processing, the activation data is generated at Step S131, and it is determined whether the operation history data is to be transmitted to the mobile terminal 16 for execution at Step S133.

When it is "NO" at Step S133, the display 54 presents the coded image including the activation data (having the activation data embedded therein) at Step S135, and the information processing is terminated. Conversely, when it is "YES" at Step S133, the operation history data is generated at Step S137, the display 54 presents the coded image including the activation data and the operation history data at Step S139, and the information processing is terminated.

As the information processing of the mobile terminal 16 and the answering process of the server 12 are the same as those in the first embodiment, descriptions are omitted.

According to the fourth embodiment, the chatbot service may be activated in the mobile terminal 16 without a wireless communication.

The aspect described in the fourth embodiment may also be adapted in combination with the second embodiment and the third embodiment.

The specific configurations, and the like, described in the embodiments above are examples and may be changed as appropriate for the actual product. Furthermore, the processing order of the steps in the flowchart described in the embodiments above may be changed as appropriate as long as the same result is obtained.

What is claimed is:

1. An image processing system comprising:
an image processing device;
a mobile terminal; and
an information processing device having a chatbot function to receive a question, transmitted from the mobile terminal, about the image processing device and automatically give an answer, wherein
the image processing device includes:
an inputter that receives an input operation by a user;
an activation data generator that generates activation data for activating the chatbot function from the mobile terminal when a predetermined activation operation is received;
an operation history data generator that generates data on an operation history of the input operations received by the inputter; and
a first transmitter that transmits the activation data and the data on the operation history to the mobile terminal,
the mobile terminal includes:
a first acquirer that acquires the activation data and the data on the operation history;
an accessor that accesses the chatbot function of the information processing device in accordance with the activation data;
a second transmitter that transmits the data on the operation history to the information processing device when accessing the chatbot function; and
a third transmitter that transmits data on a question input by the user, to the information processing device, and
the information processing device includes:

a second acquirer that acquires the data on the question and the data on the operation history; and an answerer that answers the question in accordance with content of the question and content of the operation history.

2. The image processing system according to claim 1, wherein the image processing device and the mobile terminal are capable of performing a wireless communication with each other, and the first acquirer acquires the activation data and the data on the operation history via the wireless communication.

3. The image processing system according to claim 1, wherein the information processing device further includes a predictive conversion candidate setter that sets a predictive conversion candidate word in accordance with the content of the operation history, and the mobile terminal further includes:

a third acquirer that acquires data on the predictive conversion candidate word from the information processing device; and a presenter that presents the predictive conversion candidate word when an input of the question is received.

4. The image processing system according to claim 1, wherein the information processing device further includes an expected question setter that sets an expected question in accordance with the content of the operation history, and the mobile terminal further includes:

a fourth acquirer that acquires data on the expected question from the information processing device; and a presenter that presents the expected question when an input of the question is received.

* * * * *